United States Patent [19]
Nakayama et al.

[11] Patent Number: 5,911,608
[45] Date of Patent: Jun. 15, 1999

[54] EXHAUST SYSTEM FOR OUTBOARD MOTORS

[75] Inventors: Manabu Nakayama; Yukinori Kashima; Kouji Abe, all of Hamamatsu, Japan

[73] Assignee: Sanshin Kogyo Kabushiki Kaisha, Hamamatsu, Japan

[21] Appl. No.: 08/151,191

[22] Filed: Nov. 12, 1993

[30] Foreign Application Priority Data

Nov. 13, 1992 [JP] Japan ................................ 4-328775

[51] Int. Cl.[6] ........................................................ F01N 3/28
[52] U.S. Cl. ................................................ 440/89; 60/302
[58] Field of Search .................... 440/89, 77; 60/299, 60/302, 314, 295, 296

[56] References Cited

U.S. PATENT DOCUMENTS

| | | | |
|---|---|---|---|
| 2,890,674 | 6/1959 | Rose | 440/77 |
| 3,692,006 | 9/1972 | Miller et al. | 440/89 X |
| 4,735,046 | 4/1988 | Iwai | 60/302 X |
| 4,843,815 | 7/1989 | Smojver | 60/295 X |
| 5,174,112 | 12/1992 | Sougawa et al. | 440/89 X |
| 5,346,417 | 9/1994 | Isogawa | 440/89 |

FOREIGN PATENT DOCUMENTS

| | | | |
|---|---|---|---|
| 62-282878 | 6/1987 | Japan . | |
| 404159414 | 6/1992 | Japan | 60/299 |

OTHER PUBLICATIONS

Summary of Japanese 2–147101 dated Jun. 5, 1990.

*Primary Examiner*—Sherman Basinger
*Attorney, Agent, or Firm*—Knobbe, Martens, Olson & Bear

[57] ABSTRACT

A number of embodiments of an exhaust system for outboard motors that includes a trap portion in a conduit which conveys the exhaust gases from an expansion chamber formed in the drive shaft housing to an underwater exhaust gas discharge. The trap portion has a horizontal section that is disposed above the water level, and various orientations are depicted. In addition, a catalyst is also provided, and the catalyst is protected from water also by the construction.

70 Claims, 25 Drawing Sheets

EXHAUST SYSTEM FOR OUTBOARD MOTORS

BACKGROUND OF THE INVENTION

This invention relates to an exhaust system for an outboard motor, and more particularly to an improved exhaust system that is compact in nature and yet which will ensure that water cannot flow back into the critical portions of the exhaust system and/or engine, particularly under rapid deceleration of the associated watercraft.

It is well-known that the design of exhaust systems for outboard motors present a number of difficulties. In the first instance, because of the desire for maintaining a compact nature for outboard motors, it is difficult to ensure that there will be adequate treatment of the exhaust gases within the space available. This problem is particularly acute when it is also desired to provide a catalyst system for treating the exhaust gases before they are discharged to the atmosphere.

Conventionally, it has been the practice in outboard motor construction to employ a relatively large expansion chamber that is contained within the drive shaft housing of the engine. Exhaust gases are past from this expansion chamber to the atmosphere primarily through an underwater high-speed exhaust gas discharge in the lower unit. Normally exhaust gases are delivered to the expansion chamber from an exhaust pipe that extends downwardly from the exhaust ports of the engine in the associated power head and which terminates in the expansion chamber.

As is well-known, at least a substantial portion of the lower unit and at times the drive shaft housing may be submerged in the body of water in which the watercraft is operating. This deep degree of submersion exists at times when the associated watercraft is being propelled at low speeds or, alternatively, during idling. When this condition occurs, the water from the body of water in which the watercraft is operating can enter the expansion chamber through the underwater exhaust gas discharge and, at times, may reach the level of the exhaust pipe. This presents certain problems, particularly when engines having two-cycle engines are employed because, as it is well-known, the pressure at the end of the exhaust pipe can, at times, be less than atmospheric. As a result, there is a danger that water in the expansion chamber can actually be drawn back into the exhaust ports of the engine when such negative pressures exist.

It is, therefore, a principal object of this invention to provide an improved exhaust system for an outboard motor that will ensure against water entering the exhaust ports of the engine through the exhaust pipe.

It is a further object of this invention to provide an improved exhaust system for an outboard motor employing a trap between the expansion chamber and the underwater exhaust gas discharge so as to ensure against the likelihood of significant amounts of water being entered into the expansion chamber.

The problems aforenoted are even more difficult when it is proposed to employ a catalyst in the exhaust system for treating the exhaust gases before they are released to the atmosphere. As is well-known, it is desirable to place the catalyst as close to the engine exhaust ports as possible so as to ensure a proper temperature for operation. However, if water is able to enter the exhaust system and come into contact with the catalyst, then not only can the exhaust purification be substantially reduced, but the catalyst bed itself may become damaged or permanently disabled. Because of its high temperature and the fact that normally a ceramic-type of catalyst material is employed, any water coming into contact with the hot catalyst can very well shatter the catalyst bed.

It is, therefore, a still further object of this invention to provide an improved exhaust system for an outboard motor wherein a catalyst is employed but the catalyst is protected from contact with water entering through the exhaust system.

It is a further object of this invention to provide an improved catalytic exhaust system for an outboard motor.

Generally, it has been the practice to position substantially all of the components for the exhaust system of an outboard motor in the drive shaft housing and lower unit. The only components normally provided in the power head are the exhaust manifold and the upper connection of the exhaust pipe to the exhaust manifold, with the exhaust pipe depending into the expansion chamber in the drive shaft housing. At times, catalytic devices may be positioned in either the exhaust manifold or in the exhaust pipe. However, these types of systems are prone to the aforenoted defects.

The inventors have discovered that a number of the problems in connection with the prior art types of devices can be employed by positioning portions of the exhaust system in the power head in addition to the exhaust manifold of the engine. By so positioning the components of the exhaust system in the power head, a trap section can be formed so as to reduce the likelihood that water can enter the expansion chamber, even under extreme conditions such as abrupt decelerations. However, because of the extremely compact nature of outboard motors, and particularly their power heads, it had been previously thought impossible to position any substantial portion of the exhaust system or exhaust treatment devices within the power head.

It is, therefore, a still further object of this invention to provide an improved arrangement for permitting certain components of the exhaust system and exhaust treatment to be positioned in the power head apart from the engine but still maintain a compact power head construction.

SUMMARY OF THE INVENTION

A first feature of the invention is adapted to be embodied in an outboard motor having a power head comprised of an internal combustion engine having an exhaust port and a surrounding protective cowling. A drive shaft housing and lower unit depend from the power head and contain a propulsion device for propelling an associated watercraft, which propulsion device is driven by the engine. Means are provided for affixing the outboard motor to a hull of an associated watercraft for its propulsion. An expansion chamber is formed in the drive shaft housing and lower unit and is positioned to be at least in part submerged in the body of water in which the watercraft is operating at least when the watercraft is stationary. An exhaust pipe extends from the exhaust port into the expansion chamber below the upper end thereof for delivering exhaust gases from the engine to the expansion chamber. An underwater exhaust gas discharge is positioned to extend below the water level at substantially all running conditions of the watercraft. Exhaust conduit means extend from the expansion chamber to the underwater exhaust gas discharge for discharging exhaust gases from the engine to the atmosphere through the body of water in which the watercraft is operating. These exhaust conduit means include a trap section for precluding the entry of water into the expansion chamber from the underwater exhaust gas discharge, which trap section is comprised of a first upwardly extending section extending upwardly from an inlet end in the expansion chamber, a horizontally extending section disposed above the water level and communicating at one end with the upwardly extending section and at the other end with a downwardly extending section that terminates in the underwater exhaust gas discharge.

Another feature of the invention is adapted to be embodied in an outboard motor having a power head comprised of an internal combustion engine having an exhaust port and a surrounding protective cowling. A drive shaft housing and lower unit depend from the power head and contain a propulsion device driven by the engine for propelling an associated watercraft. Means are provided for affixing the outboard motor to the hull of an associated watercraft for tilt and trim movement about a generally horizontally disposed axis. An expansion chamber is formed in the drive shaft housing and lower unit and is positioned to be at least partially submerged beneath the body of water in which the watercraft is operating at least when the watercraft is stationary. An exhaust pipe extends from the exhaust port into the expansion chamber below the upper end thereof for delivering exhaust gases from the engine to the expansion chamber. An underwater exhaust gas discharge is positioned to extend below the water level in substantially all running conditions of the watercraft. Exhaust conduit means extend from the expansion chamber to the underwater gas discharge for delivering exhaust gases from the engine to the atmosphere through a body of water in which the watercraft is operating. The exhaust conduit means include a trap section having a horizontally extending portion for precluding water from entering into the expansion chamber from the underwater exhaust gas discharge. The horizontally extending section has a flow axis that extends generally parallel to the tilt and trim axis of the outboard motors for reducing the likelihood of water flow therethrough upon sudden decelerations.

Another feature of the invention is adapted to be embodied in an outboard motor having a power head comprised of an internal combustion engine having an exhaust port and a surrounding protective cowling. A drive shaft housing and lower unit depend from the power head and contain a propulsion device driven by the engine for propelling an associated watercraft. Means are provided for affixing the outboard motor to the hull of the associated watercraft. An expansion chamber is formed in the drive shaft housing and lower unit and is positioned to be at least partially submerged in the body of water in which the watercraft is operating, at least when the watercraft is stationary. An exhaust pipe extends from the exhaust port into the expansion chamber below the upper end therefor for delivering exhaust gases from the engine to the expansion chamber. An underwater exhaust gas discharge is positioned to extend beneath the water level in substantially all running conditions of the watercraft. Exhaust conduit means extend from the expansion chamber to the underwater exhaust gas discharge for delivering exhaust gases from the engine to the atmosphere through the body of water in which the watercraft is operating. The exhaust conduit means includes a trap section for precluding the entry of water into the expansion chamber from the underwater exhaust gas discharge, which includes a horizontally extending section that is positioned wholly within the power head.

Yet another feature of the invention is adapted to be embodied in an outboard motor having a power head comprised of an internal combustion engine having a plurality of cylinders aligned in a vertical plane and each of which has at least one exhaust port. A surrounded protective cowling encircles the engine and completes the power head. A drive shaft housing and lower unit depend from the power head and contain a propulsion device driven by the engine for propelling an associated watercraft to which the outboard motor is attached. The cylinders are inclined to a longitudinally extending vertical plane parallel to the direction of the propulsion force at an acute angle. An expansion chamber is formed within the drive shaft housing and lower unit. Exhaust pipe means convey exhaust gases from the exhaust ports to the expansion chamber. An underwater exhaust gas discharge discharges exhaust gases to the atmosphere through the body of water in which the watercraft is operating, and conduit means convey the exhaust gases to the underwater exhaust gas discharge from the expansion chamber. This conduit means includes a portion that is contained within the power head apart from the engine and which is disposed at least in part on the side of the engine between the cylinders and the plane and contained within the protective cowling.

DETAILED DESCRIPTION OF THE PREFERRED EMBODIMENTS

Embodiment of FIGS. 1–4

Figure 1:
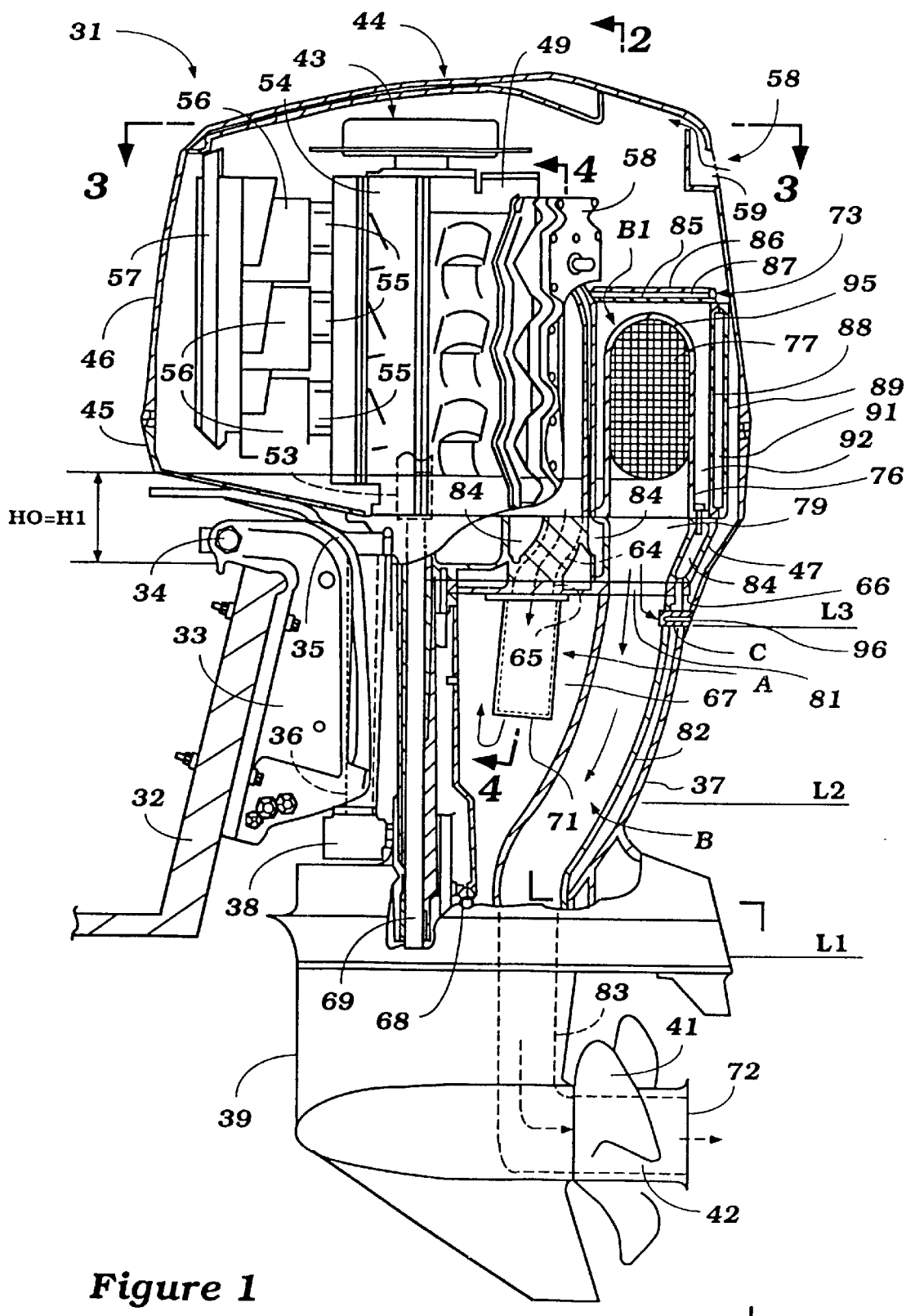
FIG. 1 is a side elevational view of an outboard motor constructed in accordance with a first embodiment of the invention, as attached to the transom of an associated watercraft, shown partially and in cross section, and having portions broken away so as to more clearly show the construction.
Figure 2:
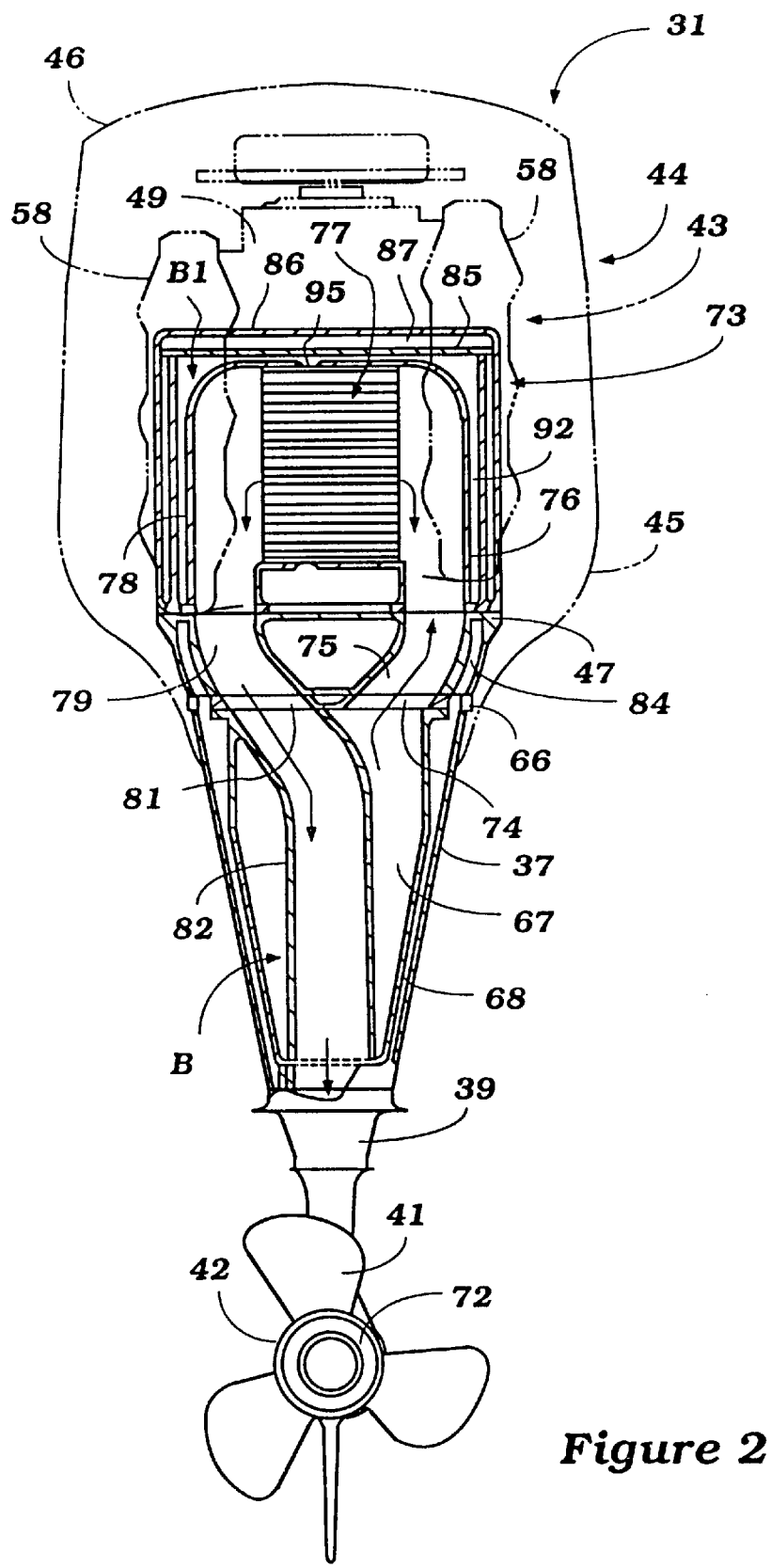
FIG. 2 is a cross-sectional view taken along the line 2—2 of FIG. 1 with portions of the protecting cowling shown in phantom.
Figure 3:
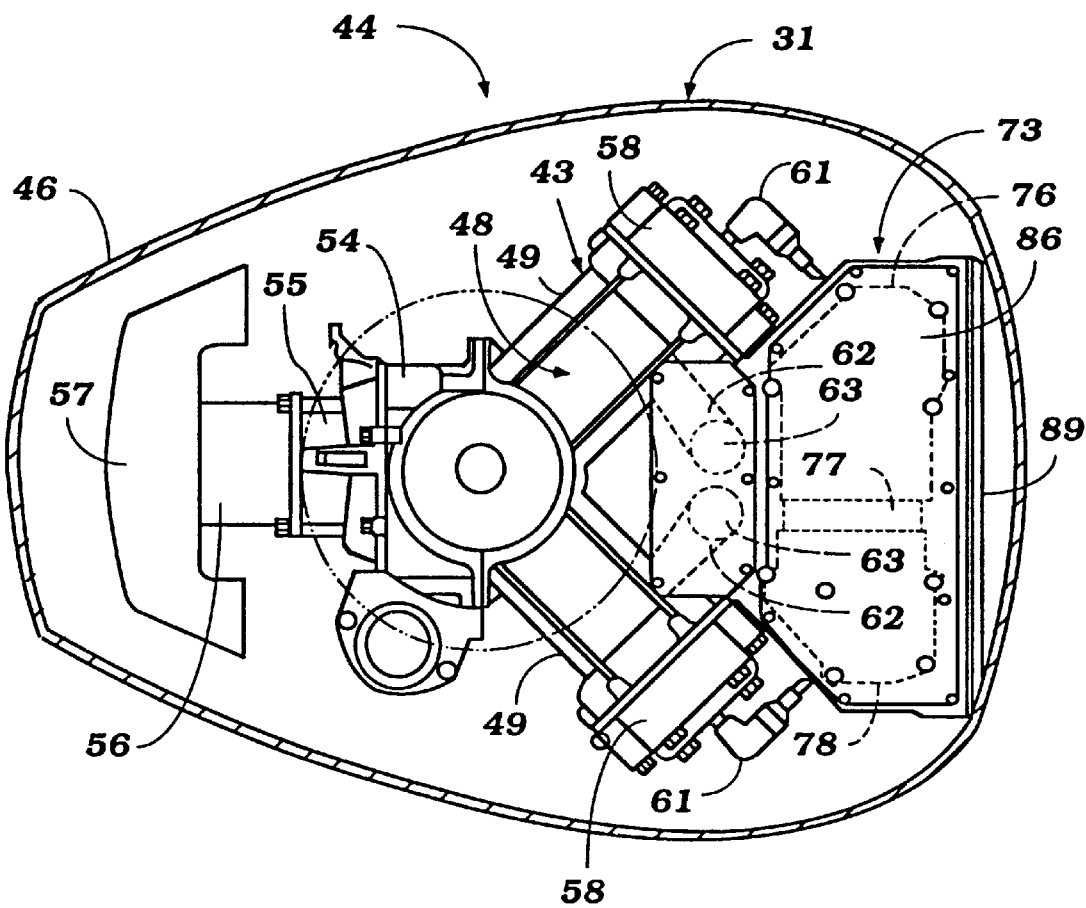
FIG. 3 is a cross sectional view taken along the line 3—3 of FIG. 1.

An outboard motor constructed in accordance with a first embodiment of the invention is identified generally by the reference numeral 31 and is shown in these figures. The outboard motor 31 is depicted as being attached to the transom 32 of an associated watercraft, shown partially and in phantom. The attachment is provided by means of a clamping bracket 33 that is affixed to the transom 32 in any well-known manner and which is pivotally connected by means of a pivot pin 34 to a swivel bracket 35 for tilt and trim movement of the outboard motor 31 about a horizontally disposed tilt axis.

A steering shaft 16 is journalled for steering movement about a vertically extending axis in the steering bracket 35 and is connected to a drive shaft housing assembly, indicated generally by the reference numeral 37, by upper and lower bracket attachments, only the lower of which is shown and identified by the reference numeral 38. A lower unit 39 depends from the drive shaft housing 37 and rotatably journals a propeller 41 having a hub 42 on a propeller shaft (not shown). This propeller shaft is driven by a conventional forward neutral reverse bevel gear transmission (not shown), which is driven in a manner to be described.

Positioned above the drive shaft housing 37 is a power head that includes an internal combustion engine, indicated generally by the reference numeral 43, which, in the illustrated embodiment, is of the V6 type and operates on a two-stroke crank case compression principle. It is to be understood that the invention can be employed with engines having other cylinder numbers and arrangement. An embodiment of an in-line engine is depicted and will be described later. It should also be apparent that the invention can be employed in conjunction with four-cycle engines and rotary engines as opposed to reciprocating engines.

The power head is completed by a protective cowling, indicated generally by the reference numeral 44, which is comprised of a lower tray 45 and an upper main cowling portion 46 that is detachably connected to the tray 45 in a well-known manner. The engine 43 is supported within this protective cowling on a spacer plate assembly 47, which lies at approximately the level of the upper edge of the transom 32 and to which the tray 45 is affixed in a well-known manner.

Although the internal details of the construction of the engine 43 are not necessary to permit those skilled in the art to understand and practice the invention, which deals primarily with the exhaust system for the outboard motor 31, the general layout of the components is significant in the invention. Therefore, a general discussion of the configuration and construction of the engine 43 will follow.

As has been noted, the engine 43 is of the V type, and it includes a cylinder block, indicated generally by the reference numeral 48, which is comprised of a pair of angularly disposed cylinder banks 49. The cylinder banks 49 diverge from a vertically extending plane containing the axis of the output shaft of the engine 43, as will be described, and extending in a fore and aft direction. The cylinder banks 49 are disposed at an acute angle to this plane.

Figure 4:
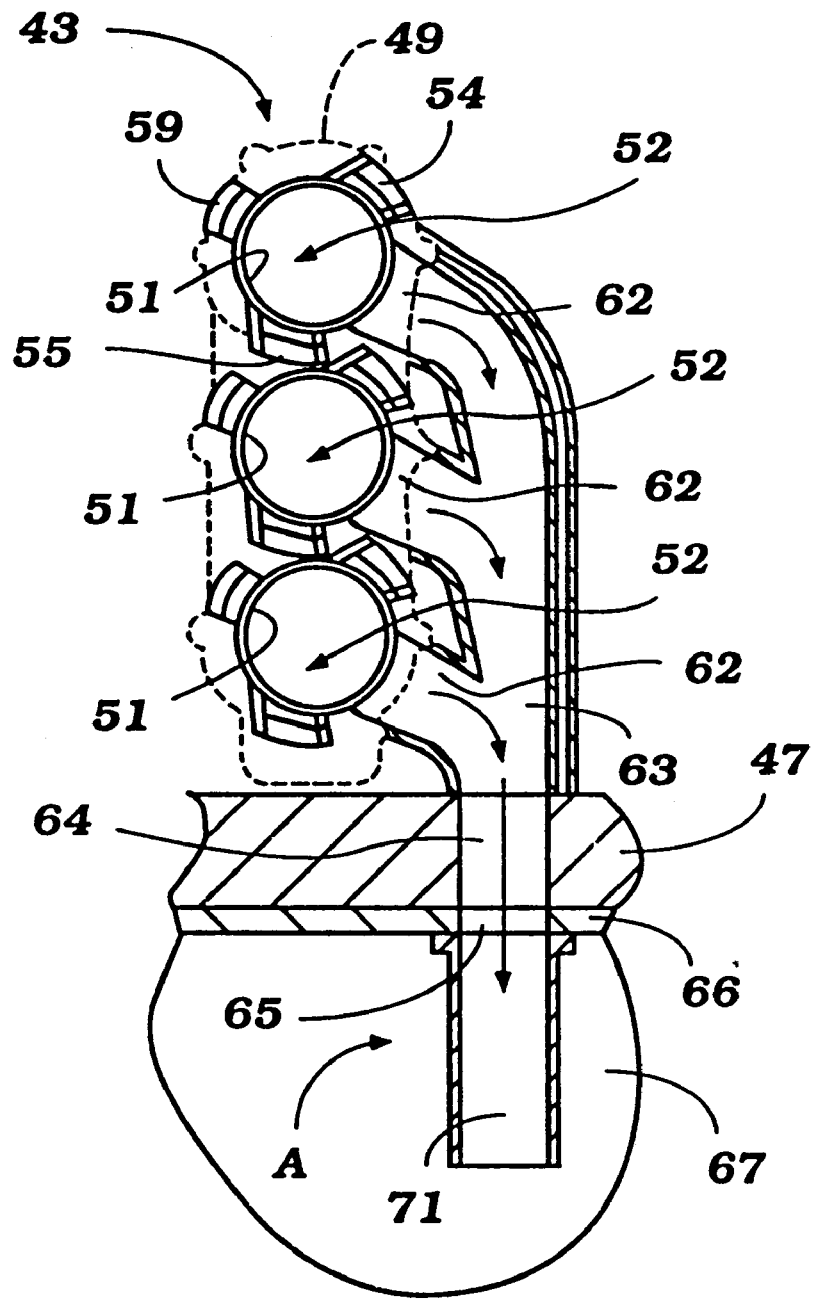
FIG. 4 is a cross sectional view taken through one of the banks of cylinders of the engine.
Figure 5:
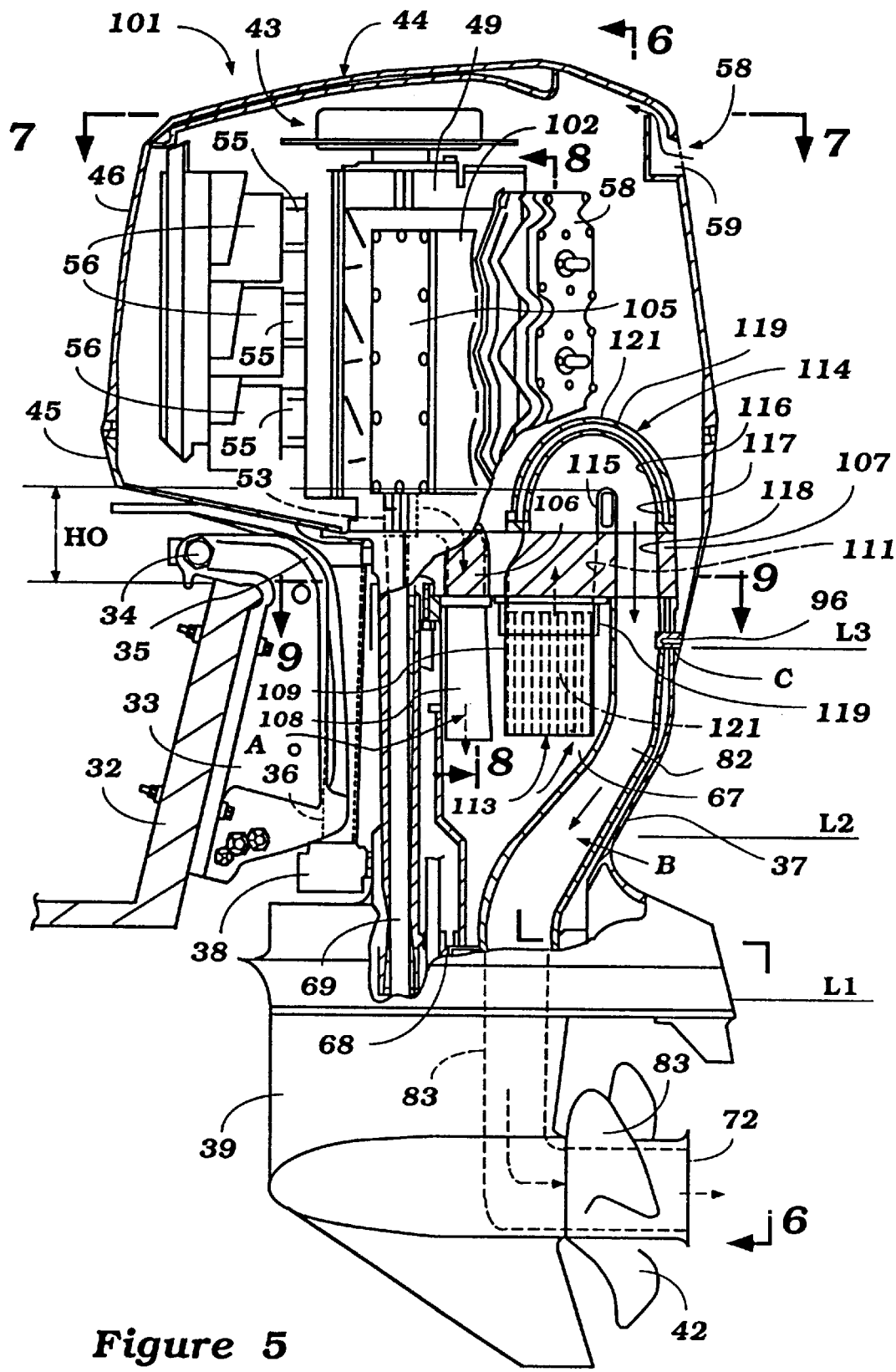
FIG. 5 is a side-elevational view, in part similar to FIG. 1, and shows a second embodiment of the invention.
Figure 6:
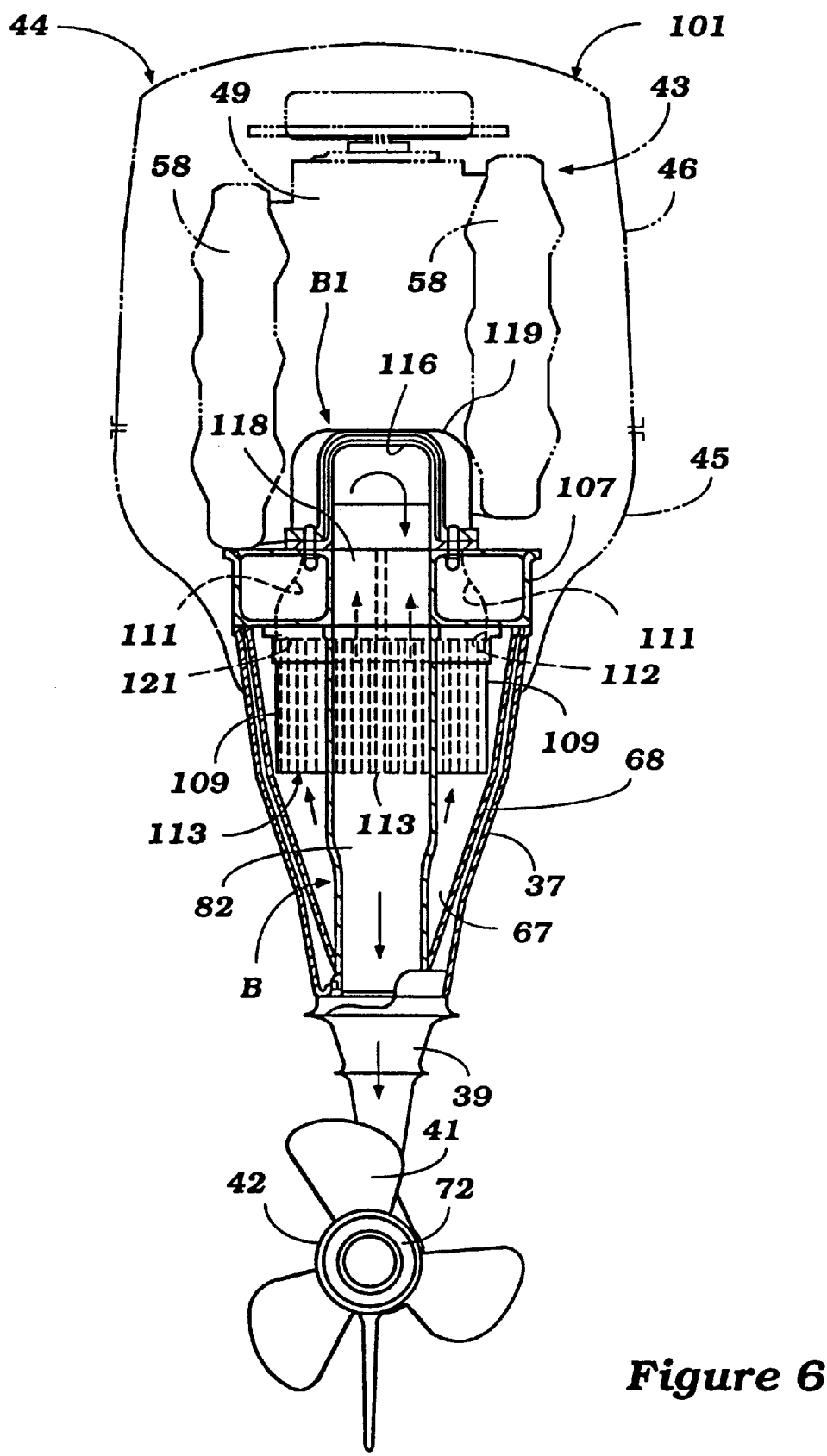
FIG. 6 is a cross sectional view taken along the line 6—6 of FIG. 5, with portions shown in phantom
Figure 7:
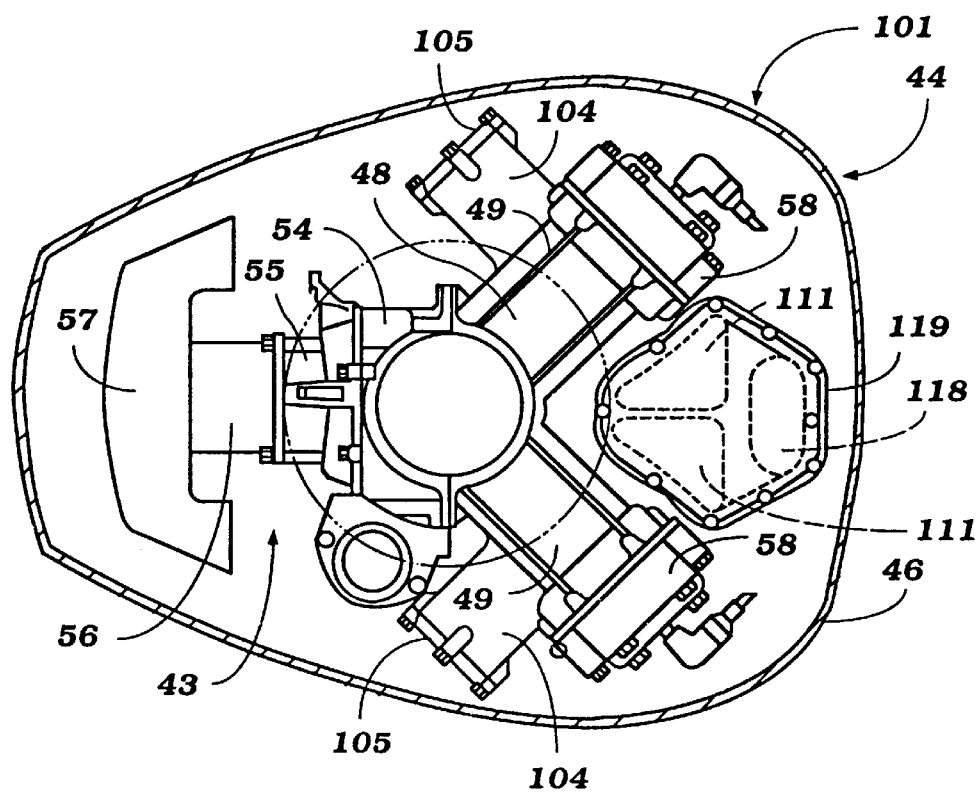
FIG. 7 is a cross sectional view taken long the line 7—7 of FIG. 5

As may be seen in FIG. 4, each cylinder bank 49 is formed with three vertically spaced cylinder bores 51, which may be formed from pressed-in liners or the like and which slidably support pistons 52. The pistons 52 are connected by means of connecting rods (not shown) to a crank shaft, which appears only partially in FIG. 1 and is identified generally by the reference numeral 53. This crank shaft 53, as is typical with outboard motor practice, is rotatably journalled for rotation about a vertically extending axis by means of the cylinder block 49 and a crank case member 54 that is affixed thereto in a well-known manner. The crank case member 54 and cylinder block 49 define a plurality of crank case chambers, each associated with a respective one of the cylinder bores 51 and which are sealed from each other in a well-known manner, as is typical with two-cycle crank case compression engines.

An intake manifold 55 is affixed to the crank case member 54 and carries reed-type valves which permit a charge to flow into these individual chambers but which preclude reverse flow when the pistons 52 are moving downwardly in the cylinder bores 51 to compress the charge therein. This type of construction is well-known in the art.

A plurality of dual-throat carburetors 56 or other form of charge-forming device are provided for supplying a fuel air charge to the individual crank case chambers through the manifold 55. Rather than carburetors, fuel injection may be employed and direct cylinder injection may be utilized, if desired. As previously noted, the main feature of the invention deals with the exhaust system, and where other portions of the engine are not described, they may be considered to be conventional.

An air intake device 57 is affixed to the charge formers 56 and draws atmospheric air from within the protective cowling 44 for engine operation. This air is admitted through an atmospheric air inlet, indicated generally by the reference numeral 58 (FIG. 1) and which has a rearwardly facing air inlet opening 59 through which the induction air flows, as shown by the arrows in this figure.

The charge which has been admitted to the individual crank case chambers of the engine 49 is transferred to combustion chambers formed between the heads of the pistons 52 and cylinder head assemblies 58 that are affixed to the respective cylinder banks 49 through one or more scavenge passages 59 (FIG. 4). This charge is then further compressed as the pistons 52 move upwardly and is fired by means of spark plugs 61 and an ignition system of any known type.

The burnt charge from the chambers is then discharged through exhaust ports 62 (FIG. 4) in each cylinder bank 49, which exhaust ports 62 are disposed in the valley between the cylinder banks 49. These exhaust ports 62 serve an exhaust manifold, indicated generally by the reference numeral 63, with there being one exhaust manifold for each bank of cylinders.

Each of the exhaust manifolds 63 has its discharge end extending generally downwardly and in registry with a respective exhaust gas passage 64 formed in the spacer plate 47. This passage communicates with a further passage 65 formed in a lower plate 66 that is sandwiched between the spacer plate 47 and the drive shaft housing 37.

An expansion chamber 67 is formed in the drive shaft housing 37 in part by the outer housing of the drive shaft housing 37 and by an inner member 68 that is suitably affixed therein. This expansion chamber 67 is formed rearwardly of a drive shaft 69 that is journalled in a well-known manner within the drive shaft housing 37. The upper end of the drive shaft 69 has a spline connection to the lower end of the crank shaft 53, and the lower end of the drive shaft 69 drives the aforenoted forward neutral reverse transmission for driving the propeller 41.

A pair of exhaust pipes 71 are affixed to the lower plate 69 in registry with their exhaust gas discharge opening 65 so as to deliver the exhaust gases from the respective manifold 63 to the expansion chamber 67 for expansion and silencing purposes. The exhaust manifolds 63, plate passages 64 and 65, and exhaust pipes 71 form a first conduit, indicated by the reference character A, for delivering the exhaust gases from the engine exhaust ports 62 to the expansion chamber 67.

It should be noted that the lower ends of the exhaust pipes 71 depend into the middle or lower portion of the expansion chamber 71, and thus are above the normal water line L1 when the watercraft is in a planing condition and the water line L2 when the associated watercraft is at a low speed or stationary position. However, if the watercraft is abruptly decelerated, the water line may rise to the line L3, which is clearly above the lower end of the exhaust pipe 71. Thus, under these conditions or, in fact, under many other types of conditions, it is possible that the negative pressure exhaust pulses in the exhaust pipes 71 may cause water to be drawn back into the engine.

In accordance with an important feature of the invention, a trap system is provided for connecting the expansion chamber 67 with a through-the-hub underwater exhaust gas discharge opening 72 formed in the hub 42 of the propeller 41 so as to permit discharge of the exhaust gases without the likelihood that water can be drawn into the exhaust system, and specifically into contact with the exhaust pipes 71. This trap system includes a trap and catalyzer assembly, indicated generally by the reference numeral 73, which, in accordance with an important feature of the invention, is contained within the powerhead.

This system includes a generally vertically upwardly extending section comprised of a lower opening 74 formed in the lower plate 66 and which communicates with a further vertically extending passageway 75 that extends upwardly and to one side of the power head through the spacer plate 47. This passageway communicates with a vertically extending section 76, which terminates at a horizontally extending section in which a catalyst bed, indicated generally by the reference numeral 77, is positioned. It should be noted that this horizontally extending section 76 extends along and defines an axis that is parallel to the pivot axis defined by the tilt pivot pin 34. Hence, abrupt decelerations will not cause water to flow through the passage containing the catalytic bed 77 because it is disposed transversely to the direction of acceleration and deceleration forces.

On the opposite side of the catalyst bed 77 there is formed a downwardly extending passageway 78 that communicates with a corresponding passageway 79 formed in the spacer plate 47, which again curves back inwardly. The passageway 79 communicates with an opening 81 formed in the lower plate 66 and which communicates with a further exhaust conduit 82 formed in part by the expansion chamber forming member 68. The conduit terminates in a downwardly opening end that communicates with a passageway 83 formed in the lower unit 39, which, in turn, terminates at the through-the-hub exhaust 72. The trap section, as thus far described, and the conduit portions 67 and 82 constitute a second exhaust conduit, indicated by the reference character B, which conveys the exhaust gases to the underwater discharge 72 from the expansion chamber 67. In addition, the exhaust gases will be treated within the catalyst bed 77 and the trap section, which has its horizontal portion disposed at a height $H_0$ about the transom 32 will ensure that any water that may enter the lower portions of the conduit, and specifically the passages 83 and conduit 82, will not reach the catalyst 77 nor flow back into the expansion chamber 67 where they could be drawn into the engine through the exhaust pipes 71. Hence, this provides a very compact and yet effective exhaust treatment arrangement.

The engine 43 is also water-cooled. Water for its cooling is drawn through an underwater inlet formed in the lower housing 39 by means of a coolant pump (not shown). As is conventional, this coolant pump is driven by the drive shaft 69 at the interface between the drive shaft housing 37 and the lower unit 39. The water is circulated through the engine 43 in any suitable manner. In addition to being circulated through the cooling jackets of the engine 43, which may also include cooling jackets around the exhaust manifold 63, the liquid coolant is circulated through a cooling jacket 84 formed in the spacer plate 47, which extends around the exhaust passages 64 and also the exhaust passages 47 and 79 of the trap section 77. This provides additional cooling for the exhaust gases and also assists in their silencing. At the same time, it ensures that the engine 43 will not be overheated by the exhaust gases.

There is also provided a box-like container formed around the tray device 73, and this box-like chamber is comprised of a cover made up of a double-wall section having a lower wall 85 and an upper wall 86 that define a cooling jacket 87, and side and back walls comprised of inner members 88 and outer members 89 that define a cooling jacket 91 therebetween. The liquid coolant from the engine may also be circulated through this cooling jacket so as to ensure that the power head maintains at a low temperature. However, it should be noted that this cooling jacket is spaced outwardly of a chamber 92 that encircles the trap section 73 so as to provide an air gap therebetween so as to avoid excess cooling of the catalyst bed 77.

It should be noted that the cover plate, made up of the inner and outer walls 85 and 86, is removable so as to access the trap section 73. It should be noted that the conduit sections 76 and 78 are formed from separate members and have a slip joint with an intermediate member 95 which, in fact, forms the outer shell of the bed 77. Hence, the catalyst bed 77 may be easily replaced for servicing by removing the upper cowling portion 46, cover plate 86, and then lifting out the trap section 73 that is contained within the box-like enclosure previously described.

It should also be noted that the trap section 73 is at least in part positioned between the valley of the cylinder banks 49, and more accurately between the cylinder heads 58. This permits a compact assembly, and it will also be seen that a major portion of the trap section 73 lies between the acute angle defined by the cylinder banks 49 and the longitudinal center plane containing the axis of rotation of the crank shaft 53. This further adds in space utilization in providing a compact assembly.

As is well-known, when the watercraft is operating at a low speed, the water line will elevate to the line L2, and under this condition the water pressure at the underwater exhaust gas discharge 72 and the relatively low exhaust gas pressure due to the low speed will mean that the exhaust gases cannot exit through this opening. In accordance with another feature of the invention, there is provided a relatively simple above-the-water exhaust gas discharge, indicated generally by the reference numeral 96, which extends from the upper end of the conduit portion 82 immediately below the lower spacer plate opening 81 to the atmosphere. This above-the-water exhaust gas discharge 96 is positioned approximately at the height of the transom and above the maximum anticipated water line L3, which will occur under severe decelerations. Hence, it will be ensured that water cannot enter the exhaust system through this above-the-water exhaust gas discharge 96. In addition, because the discharge 96 is positioned downstream of the expansion chamber 67, the exhaust gases reaching it will have been silenced by substantially the full exhaust system, and hence no auxiliary low-speed exhaust silencing system is required, as with many prior art types of constructions.

Embodiment of FIGS. 5–9

An outboard motor constructed in accordance with a second embodiment of the invention is identified by the reference numeral 101 and is shown in these figures. In many instances, the outboard motor 101 has substantially the same construction as that previously described, and where this is the case, those components have been identified by the same reference numerals and will be described again only where necessary to understand the construction and operation of this embodiment.

Figure 8:
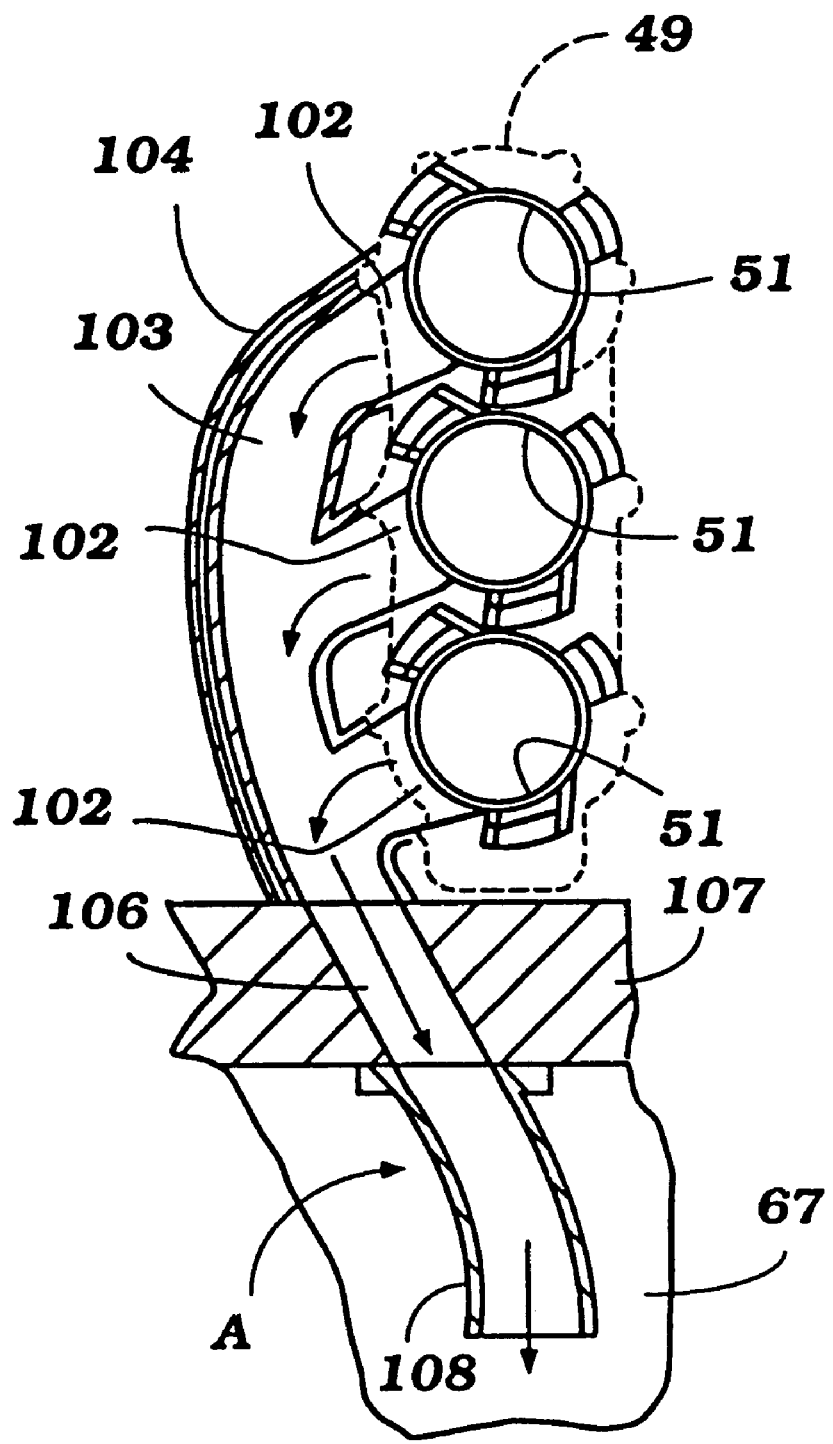
FIG. 8 is a cross-sectional view taken along line 8—8 of FIG. 5 and shows the manifold and exhaust pipe associated with one bank of the engine.

The basic engine 43 of this embodiment differs from the engine 43 of the previously described embodiment in that the exhaust ports of this embodiment extend on the outside of the cylinder banks 49 rather than on the inside, as indicated at 102 in FIG. 8. These exhaust ports 102 communicate with an exhaust manifold 103 that is contained within a cover assembly 104 so that engine coolant may be circulated through it if desired. Removable cover plates 105 close the outer periphery of the cover assembly 104 so that the manifold 103 may be serviced if desired.

The manifold outlets communicate with exhaust passages 106 formed in a spacer plate 107, which, like in the previously described embodiment, extends between the engine 43 and the upper portion of the drive shaft housing 37. The spacer plate 107 is shown in more detail in FIG. 9, and this shows the orientation of the various exhaust passages that are formed in it, including an opening that passes the drive shaft 69.

Exhaust pipes 108 are affixed to the underside of the spacer plate 107 and depend into the expansion chamber 67 at an elevation approximately the same as that in the previously described embodiment. The exhaust pipes 108 and the passageway 106 in the spacer plate 107 form the first exhaust conduit A that discharges the exhaust gases from the exhaust ports 102 into the expansion chamber 67.

A second conduit indicated by the reference character B conveys the exhaust gases from the expansion chamber 67 to the underwater exhaust gas discharge 72, and this includes the passage 82 in the lower unit 39, which is the same as aforedescribed. In this embodiment, however, there are provided in the drive shaft housing 67 a pair of vertically extending tubular sections 109 that are disposed in side-by-side relationship and which communicate at their upper ends with passageways 111 formed in the spacer plate 107. A pair of catalyst beds 112 are contained in these tubes 109, and thus the catalyst in this embodiment is disposed in the expansion chamber 67 on the upstream side of the trap section, now to be described.

This catalyst bed assembly and this portion of the exhaust system is indicated generally by the reference numeral 113. It should be understood that the catalyst beds 112 may be easily replaced for servicing by removing the entire spacer plate assembly 107 from the drive shaft housing 37. It should be noted from FIG. 7 that the vertically extending passageways 109 and the spacer plate passageways 111 are disposed so that they lie between the axis containing the cylinder bores of the cylinder blocks 49 and the longitudinally extending plane, and also are nested in the valley of the V of the engine 43. This permits the assembly to be even more compact than the previously described embodiment.

A trap section, indicated generally by the reference numeral 114, is provided in the power head, and specifically within the protective cowling 44 above the spacer plate 107. This trap section 114 includes a vertically extending portion 115 that forms an extension of the spacer plate passages 111 and a horizontally extending section 116, which has its lower peripheral edge a distance $H_O$ above the transom 32, so again to ensure that water cannot flow back into the expansion chamber 67, even under extreme decelerations.

In this embodiment, the horizontal portion 116 extends from a forward direction to a rearward direction rather than transversely as in the previously described embodiment. Although this provides a little less protection against water traveling forwardly when the outboard motor 101 is tilted up, it does provide a more compact assembly, as should be readily apparent. The trap section 114 is completed by a downwardly extending passageway 117 that communicates with the downstream end of the horizontal portion 116 and which, in turn, communicates with the lower conduit 82, which can be the same as the previously described embodiment but which is centrally positioned in this construction, through a passage 118 in the spacer plate 107. A cover plate 119 encircles the trap section 114 and provides a jacket 121 therebetween through which coolant may be circulated if desired.

It has been previously noted that the catalyst beds 112 may be easily removed for servicing by removal of the spacer plate 107. The underside of the spacer plate 107 is provided with socket portions 119 having bores 121 into which the pipe sections 109 and catalyst beds are slidably inserted for ease of insertion and removal.

Figure 10:
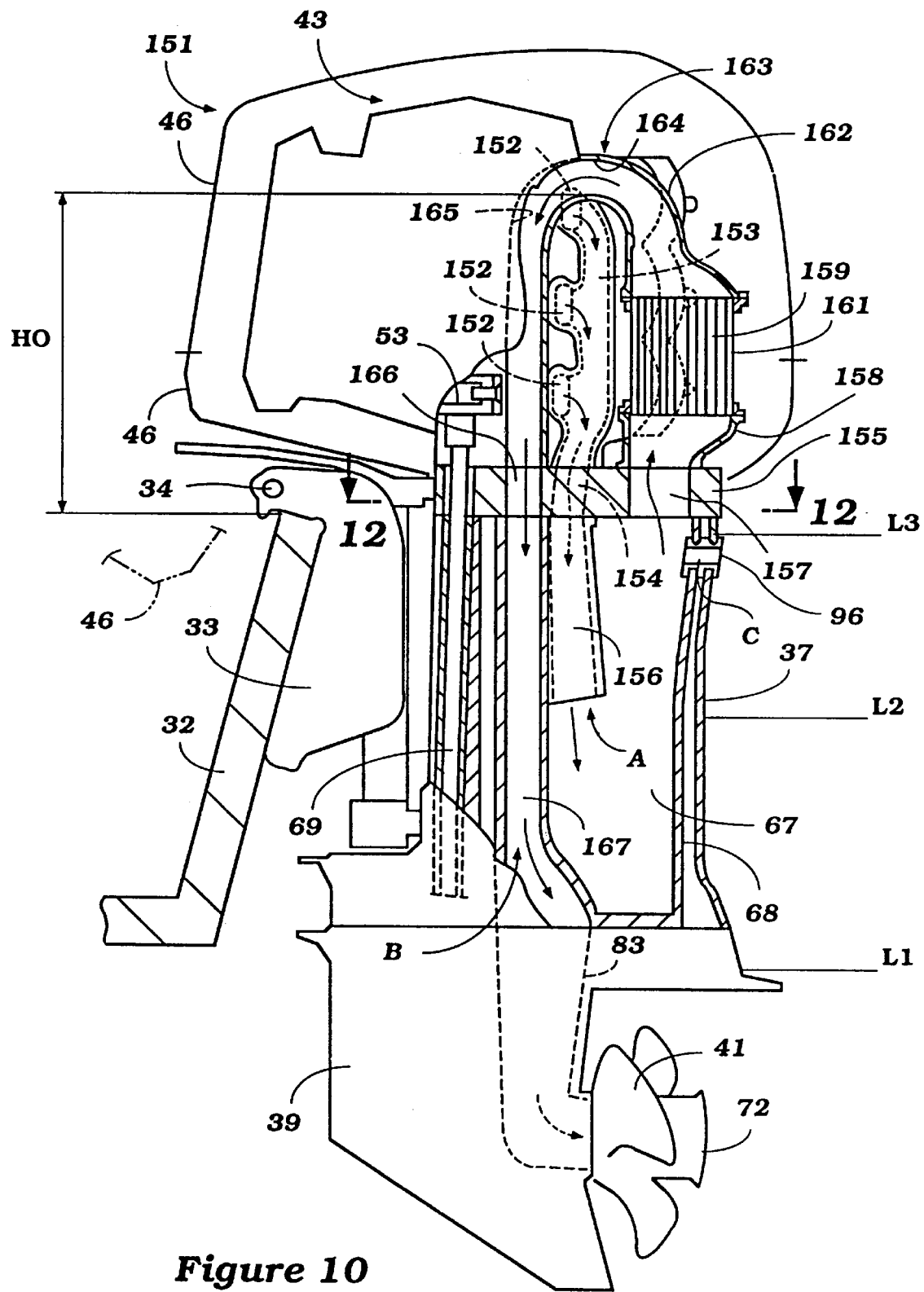
FIG. 10 is a side elevational view, in part similar to FIGS. 1 and 5, with portions broken away and other portions shown in section illustrating a third embodiment of the invention.
Figure 11:
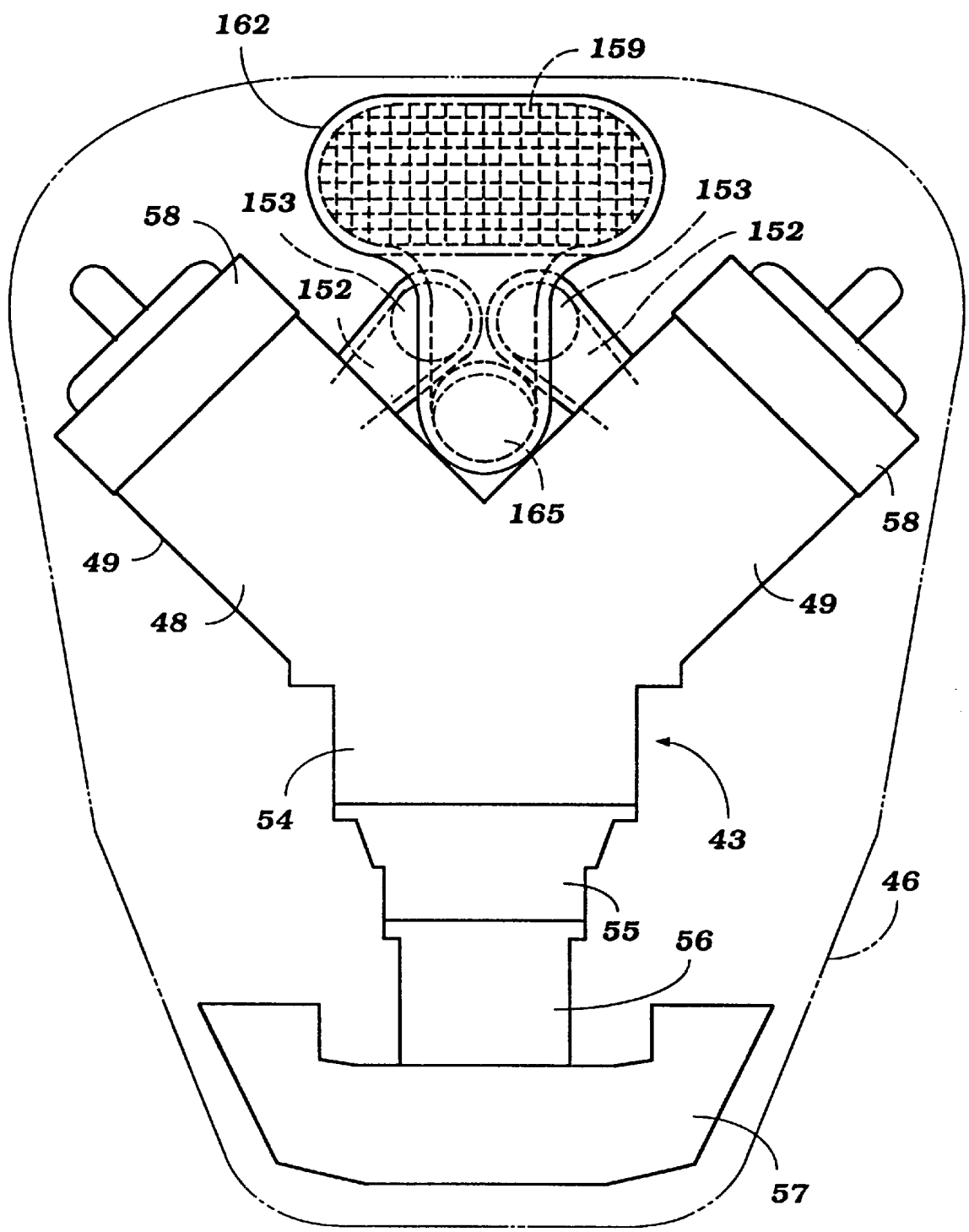
FIG. 11 is an enlarged top plan view of this embodiment, with the protective cowling shown in phantom.
Figure 12:
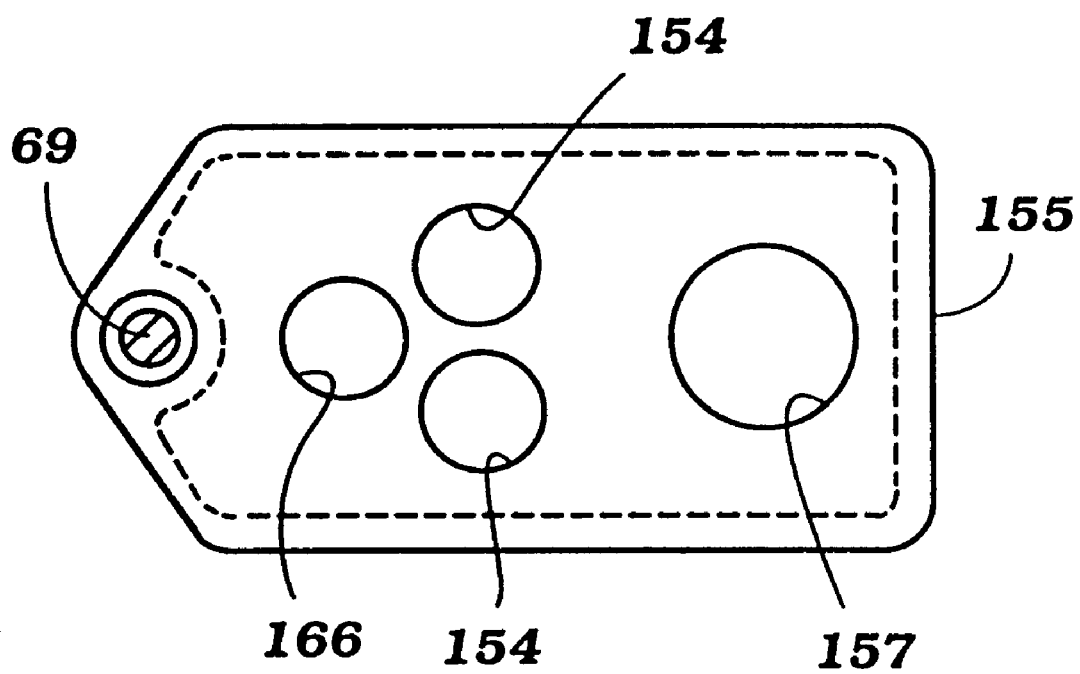
FIG. 12 is a view showing the spacer plate of this embodiment and is taken generally along the line 12—12 of FIG. 10.

Embodiment of FIGS. 10–12

An outboard motor constructed in accordance with a third embodiment of the invention is shown in these figures and is identified generally by the reference numeral 151. Again, many components of this embodiment are the same or substantially the same as those previously described, and where that is the case, these components have been identified by the same reference numerals. The basic difference between this embodiment and the embodiment of FIGS. 5–9 is that in this embodiment the catalyst bed is positioned in the power head rather than in the drive shaft housing, and the exhaust manifold is disposed between the cylinder banks, like the embodiment of FIGS. 1–4. However, this embodiment retains all of the advantages of the embodiment of FIGS. 5–9.

Referring now to FIGS. 10–12 in detail, as may be seen, the exhaust ports 152 are formed between the cylinder banks. These exhaust ports 152 communicate with respective exhaust manifolds 153, each affixed to the exhaust side of the respective cylinder bank 49 and which extend vertically downwardly.

The exhaust manifolds 153 terminate at and communicate with exhaust passages 154 formed in a spacer plate 155. Like all of the previously described embodiments, the spacer plate 155 supports the engine 43 and is positioned at the upper end of the drive shaft housing 37. This plate is shown in most detail in FIG. 12.

A pair of exhaust pipes 156 are affixed to the underside of the plate 155 and depend into the expansion chamber 67 to deliver the exhaust gases from the engine 43 to the expansion chamber 67 for silencing. Thus, the exhaust ports 152, exhaust manifold 153, plate openings 154 and exhaust pipes 156 form the first conduit section A that delivers the exhaust gases from the engine 43 to the expansion chamber 67. As with the previously described embodiments, the exhaust pipes 156 terminate in the expansion chamber 67 at a point just slightly above the normal stationary water level L2.

As with the previously described embodiments, a second conduit, indicated generally at B, conveys the exhaust gases from the expansion chamber 67 to the underwater high-speed exhaust gas discharge 72. This conduit is formed by an opening 157 at the rear of the spacer plate 155, and which opening has a relatively large effective diameter. A support pipe 158 is affixed to the upper side of the spacer plate 155 and has a passageway that communicates with the plate passage 157. A catalyst bed 159 has an outer shell 161 that is detachably connected to the support pipe 158 and forms an extension of this conduit, which terminates at an upwardly extending section 162 of a trap, indicated generally by the reference numeral 163 and which is detachably connected to the catalyst bed 159. This trap section 163 has a horizontally extending portion 164 that extends forwardly into the valley of the V, although it should be noted that the catalyst bed 159 is also disposed between the cylinder heads 158 in the valley and inwardly of the aforenoted planes containing the axes of the cylinder bores of the cylinder banks 49. This horizontal section is of substantial height so as to pass over the upper ends of the exhaust manifolds 159, as clearly shown in FIG. 10. This provides a very high height $H_0$ for the lower portion of the horizontal section 164 above the transom 32.

There is then provided a downwardly extending section 165 at the forward end of the trap 163, which section 165 extends into the base of the valley, as shown best in FIG. 11, and thus is quite close to the cylinder block 48. This passageway 165 communicates with a further opening 166 formed in the support plate 155 and which is disposed forwardly of the exhaust pipe passages 154 so as to provide a very compact assembly.

The passage 166 of the spacer plate 155 communicates with a further conduit section 167 that extends into the drive shaft housing 37 through the side of the expansion chamber 67 adjacent the drive shaft 69 and communicates with the lower unit exhaust passage 83 so that the exhaust gases will be delivered to the atmosphere through the underwater exhaust gas discharge 72 when operating at planing, as indicated by the line L1.

In this embodiment, the above-the-water high-speed exhaust gas discharge 96 is provided between the expansion chamber 67 and the drive shaft housing 37. However, the exhaust gases will still be effectively silenced through the use of the expansion chamber 67, and there will be a low exhaust noise even at idle when the exhaust gases are discharged primarily through the above-the-water exhaust gas discharge 96 due to the low submersion of the underwater exhaust gas discharge 72 and the low exhaust pressure that is existent under this condition.

Figure 13:
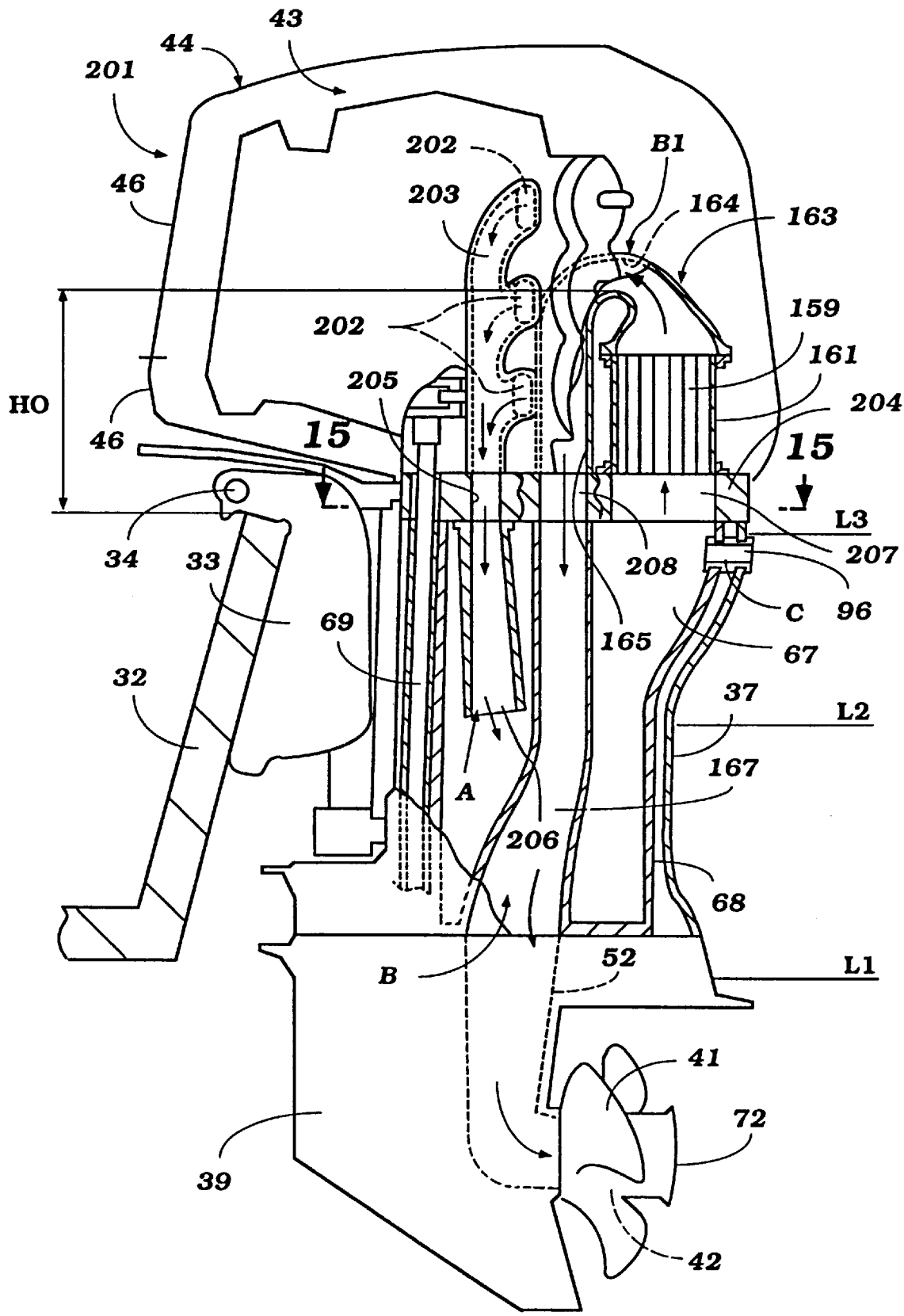
FIG. 13 is a side elevational view, in part similar to FIGS. 1, 5 and 10, of an outboard motor constructed in accordance with a fourth embodiment of this invention, with portions broken away and other portions shown in section.
Figure 14:
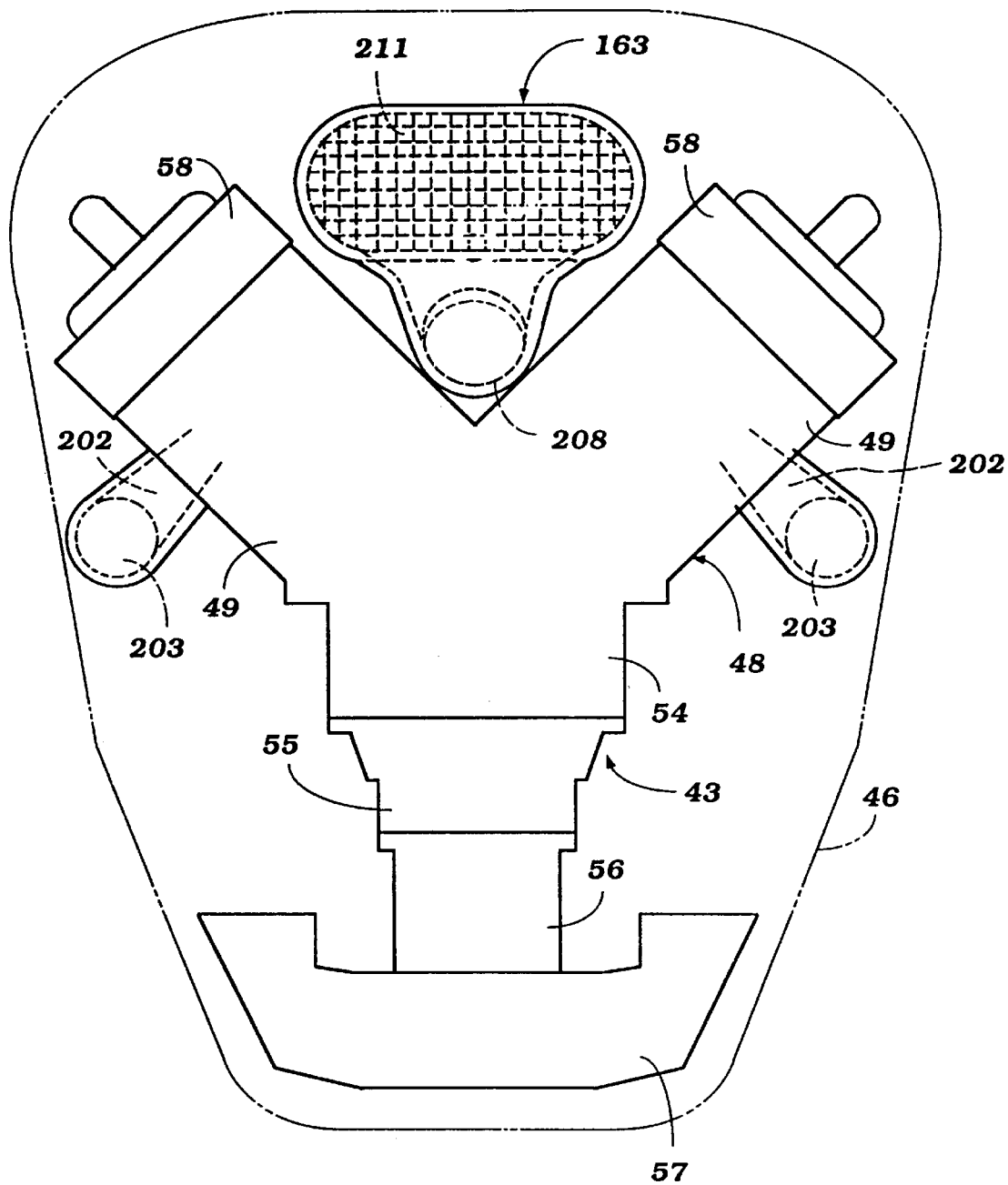
FIG. 14 is an enlarged top plan view of this embodiment, with the protective cowling being shown in phantom.
Figure 15:
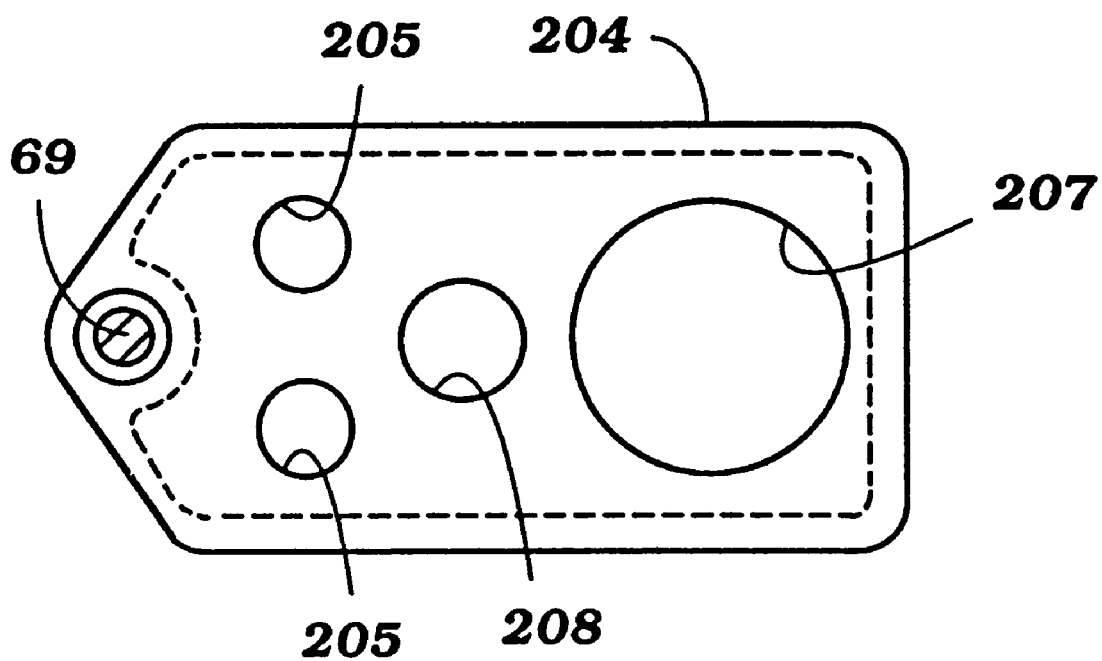
FIG. 15 is a plan view showing the configuration of the spacer plate of this embodiment and is taken generally along the line 15—15 of FIG. 13.

Embodiment of FIGS. 13–15

This embodiment is generally similar to the embodiment of FIGS. 10–12 and differs from that embodiment in that the exhaust manifolds of the engine, to be described, are disposed outside of the valley between the cylinder banks and in the way in which the catalyst bed is mounted in the power head. Because these are the only differences, components of this embodiment, which are the same or substantially the same as those of the previously described embodiments, have been identified by the same reference numerals.

The outboard motor constructed in accordance with this embodiment is identified generally by the reference numeral 201, and its exhaust ports 202 are formed on the outside of the cylinder banks 49 and cooperate with exhaust manifolds 203 that are affixed thereto. The exhaust manifolds cooperate with exhaust gas openings formed in a spacer plate 204, which is shown in detail in FIG. 15, and the openings are indicated generally by the reference numeral 205.

Exhaust pipes 206 depend from the spacer plate 204 and deliver the exhaust gases to the expansion chamber 67. Thus, the exhaust pipes 206, spacer plate passages 205 and exhaust manifold 203 form the first exhaust conduit section A.

The trap section of this embodiment is substantially the same as that of the previously described embodiment, and for that reason the same reference numerals are employed to identify components which are the same or substantially the same as the previously described embodiment. Basically, since the exhaust manifolds 203 are disposed outside of the valley between the cylinder banks 49, it is possible to move the entire trap device, indicated generally by the reference numeral 163, as in the previously described embodiment, more deeply into this valley. Also, since the trap section horizontal portion 164 need not pass over the exhaust manifold, it is possible to mount the catalyst bed 159 and its surrounding supporting jacket 161 directly on the spacer plate 204. The spacer plate 204 has an enlarged central aperture 207 that cooperates directly with the lower surface of the catalyst bed 159 so that the exhaust gases flow upwardly through it into the horizontal section 164. The vertically downwardly extending section 165 of the trap 163 communicates with an opening 208 in the spacer plate 204 that is between the openings 205 and 207 and delivers the exhaust gases through to the lower conduit portion 167 in the drive shaft housing for delivering the exhaust gases to the underwater exhaust gas discharge 72.

With this embodiment, it should be readily apparent that the catalyst bed 159 can be readily removed and replaced merely by removing the upper trap section 163. Any suitable attachment mechanism may be employed for mounting the catalyst bed 159 and specifically its outer shell 161 on the upper side of the spacer plate 204 within the protective cowling 44.

Embodiment of FIGS. 16–19

An outboard motor constructed in accordance with this embodiment is identified generally by the reference numeral 251, and the basic engine and outboard motor construction is the same as the previously described embodiments, and thus have been identified by the same reference numerals where this is the case. Only the exhaust system of this embodiment differs from those previously described, and this exhaust system will now be described in detail.

In the engine 43 in this embodiment, exhaust ports 252 are formed in the cylinder banks 49 in the area of the valley.

These exhaust ports 252 deliver exhaust gases to respective exhaust manifolds 253, which, in turn, extend downwardly and discharge their exhaust gases to a pair of adjacent openings 254 formed in a spacer plate 255. Like the previously described embodiments, the spacer plate 255 mounts the engine 43 on its upper surface and is mounted on the upper end of the drive shaft housing 37 in a well-known manner.

A pair of exhaust pipes 256 are affixed to the lower side of the spacer plate 255 and cooperate with the openings 254 so as to deliver exhaust gases to the expansion chamber 67. As with the previously described embodiments, the exhaust pipes 256 extend to an area just slightly above the water level L2 when the outboard motor 251 and associated watercraft are stationary. Thus, the exhaust manifold 253, spacer plate openings 254 and exhaust pipes 256 form the first exhaust conduit A, which delivers the exhaust gases to the expansion chamber 67.

A trap section, indicated generally by the reference numeral 257, is provided for forming a portion of a second conduit B that delivers the exhaust gases from the expansion chamber 67 to the passageway 83 in the lower unit for discharge through the high-speed below-the-water exhaust gas discharge 72. This trap device 257 is comprised of a lower plate 258 having a central opening 259 that cooperates with a central opening 261 of the spacer plate 255 so as to permit the exhaust gases to flow upwardly to the trap device through this central inlet opening 259. A catalyst support 261 is stacked upon the lower plate 258 and has a central portion that receives a removable catalyst bed 262. An air gap 263 surrounds the catalyst bed 262, and the exhaust gases flow upwardly through the catalyst bed to an upper T-shaped section 264 having a pair of horizontally extending parts 269 that extend transversely so as to be parallel to the tilt axis defined by the tilt pin 34, as with the embodiment of FIGS. 1–4. Therefore, this construction has the same advantages as that of the earlier embodiment in that sudden decelerations will not cause water to flow back to the exhaust pipes 256.

Figure 9:
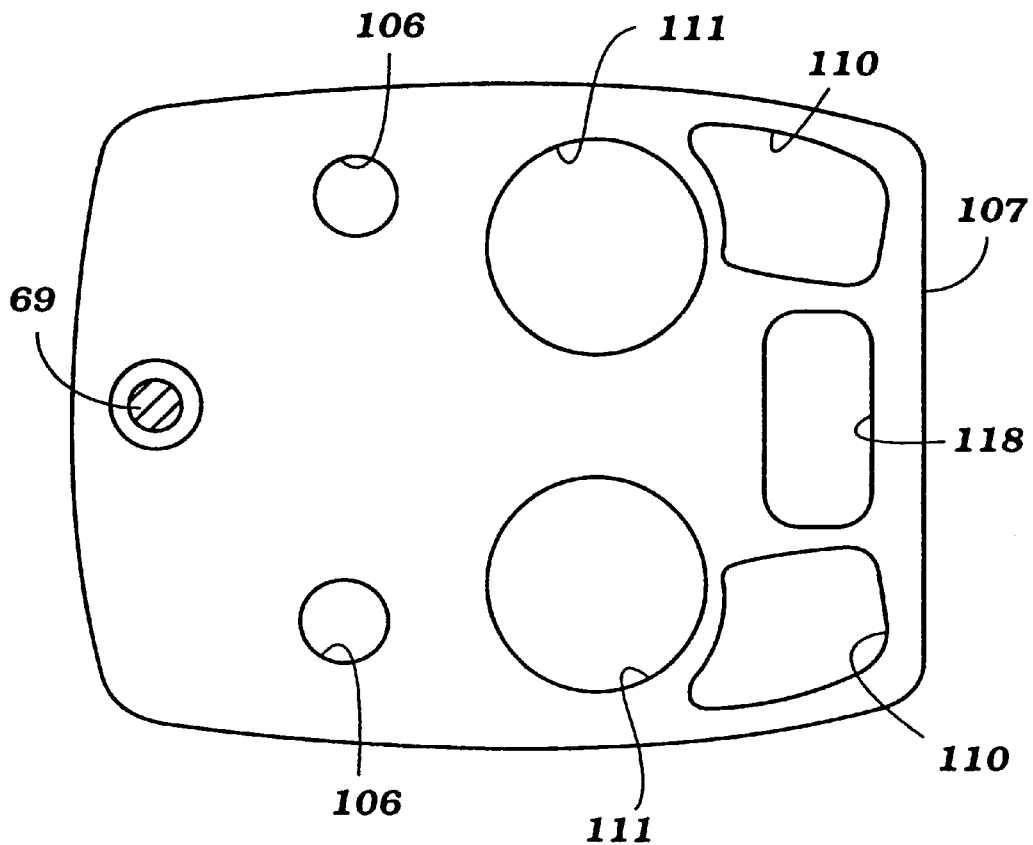
FIG. 9 is an enlarged view showing the configuration of the spacer plate and is taken generally along the line 9—9 of FIG. 5.

The upper member 259 also has a pair of downwardly facing openings 271 that communicate with a pair of vertical passages 272 formed in the catalyst support member 261. These passages 272 cooperate with further passages 273 formed in the lower plate 258. These passages, in turn, communicate with passages 274 formed in the spacer plate 255. These passages 274 are disposed transversely outwardly of the passageway 261, as best seen in FIG. 9.

A Y pipe, indicated generally by the reference numeral 275, depends into the drive shaft housing and specifically the expansion chamber 67 and has a pair of branch conduits 276 that register with the spacer plate passages 274 for receiving exhaust gases therefrom. The Y pipe 275 is affixed in any suitable manner to this spacer plate 255.

The lower end of the Y pipe 275 communicates with the lower unit exhaust conduit 83 for underwater discharge of the exhaust gases, as with the previously described embodiments.

Figure 17:
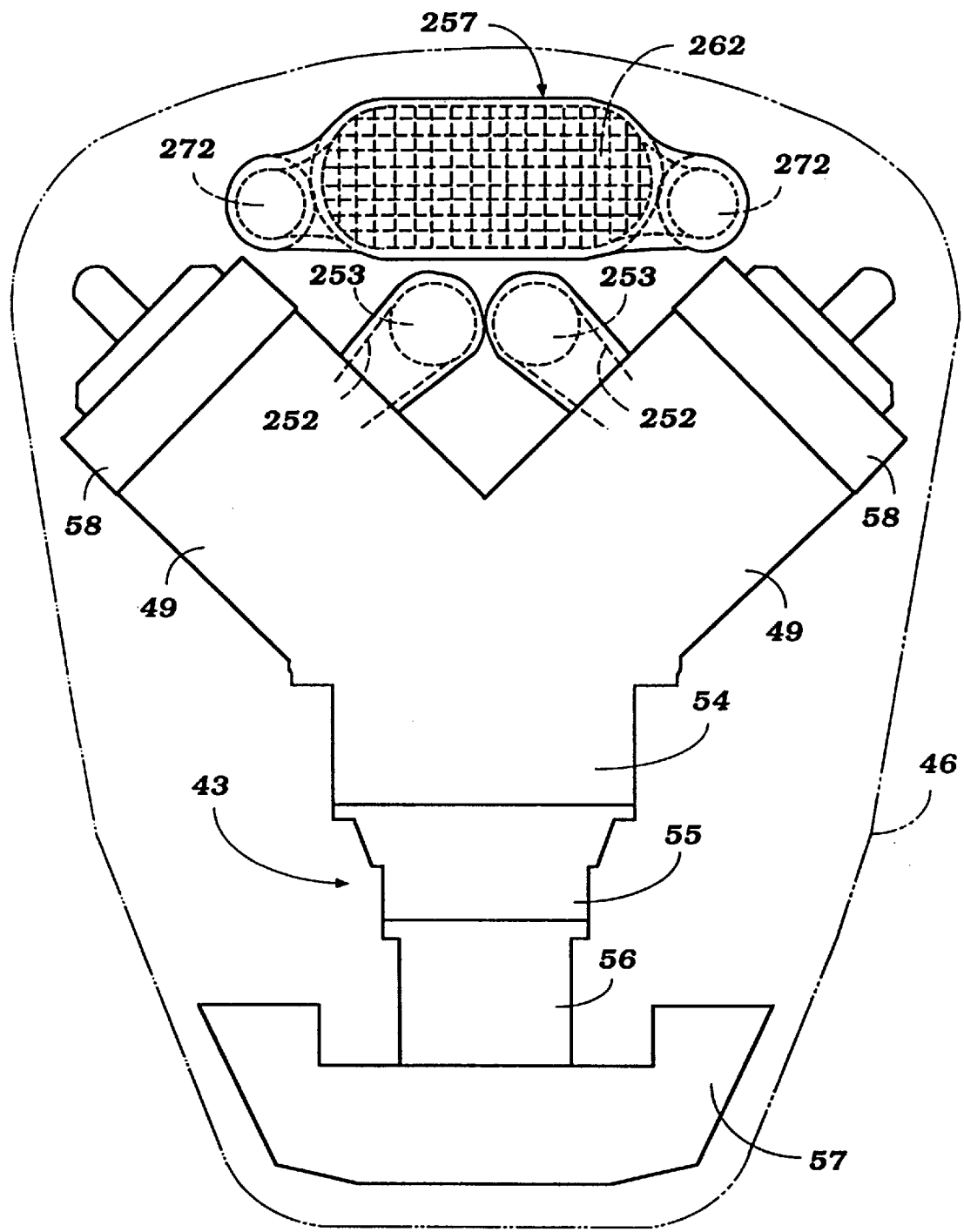
FIG. 17 is an enlarged top plan view of this embodiment, with the protective cowling shown in phantom.
Figure 18:
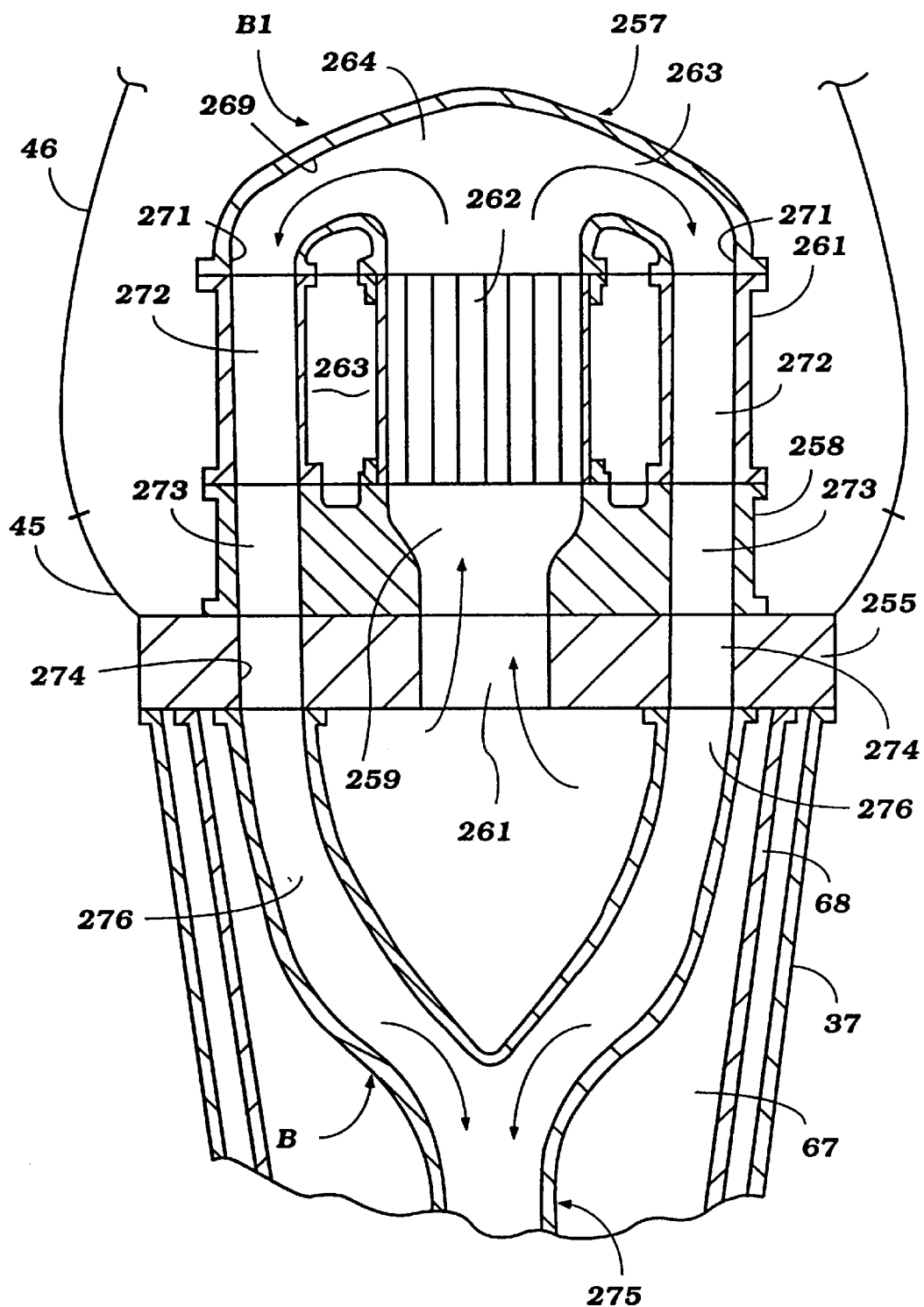
FIG. 18 is an enlarged cross-sectional view taken along the line 18—18 of FIG. 16.
Figure 19:
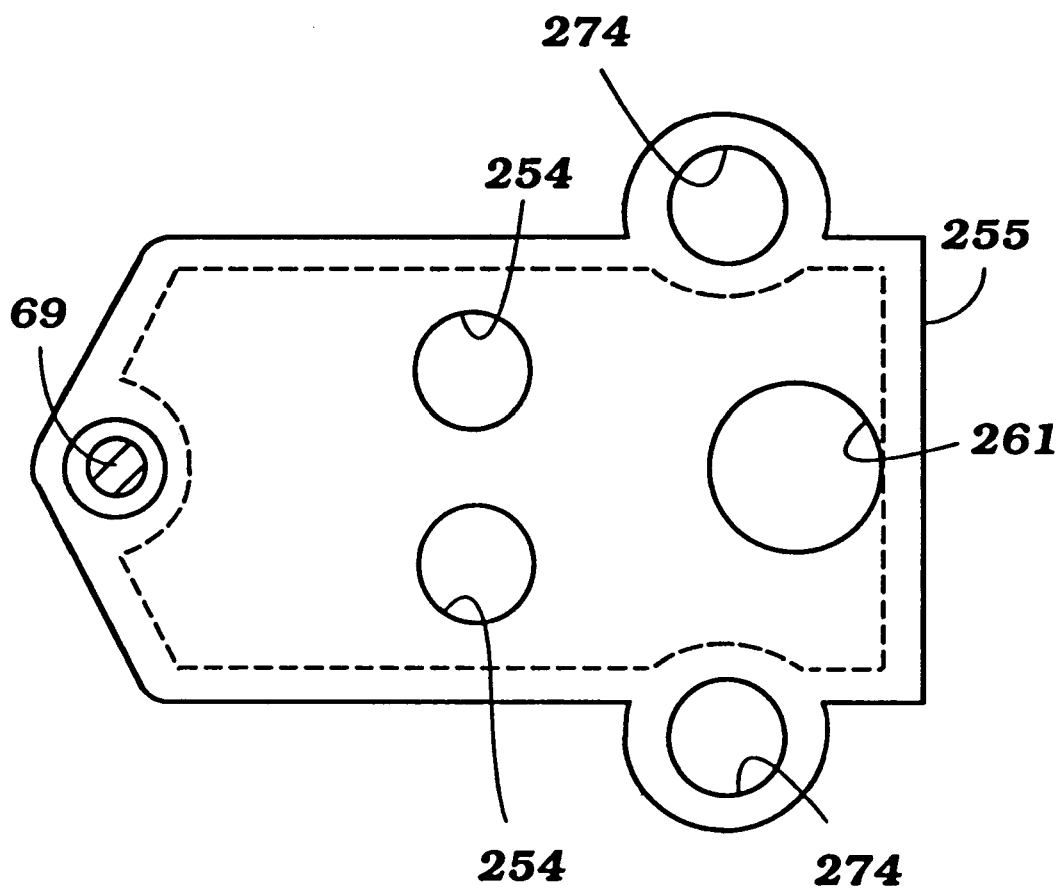
FIG. 19 is a top plan view of the spacer plate of this embodiment, on a somewhat enlarged scale and taken generally along the line 19—19 of FIG. 16.

As may be best seen in FIG. 17, the configuration thus permits at least a portion of the trap device 257 and catalyst bed 262 to be positioned in the valley between the cylinder banks, and specifically between the cylinder heads 58.

Figure 16:
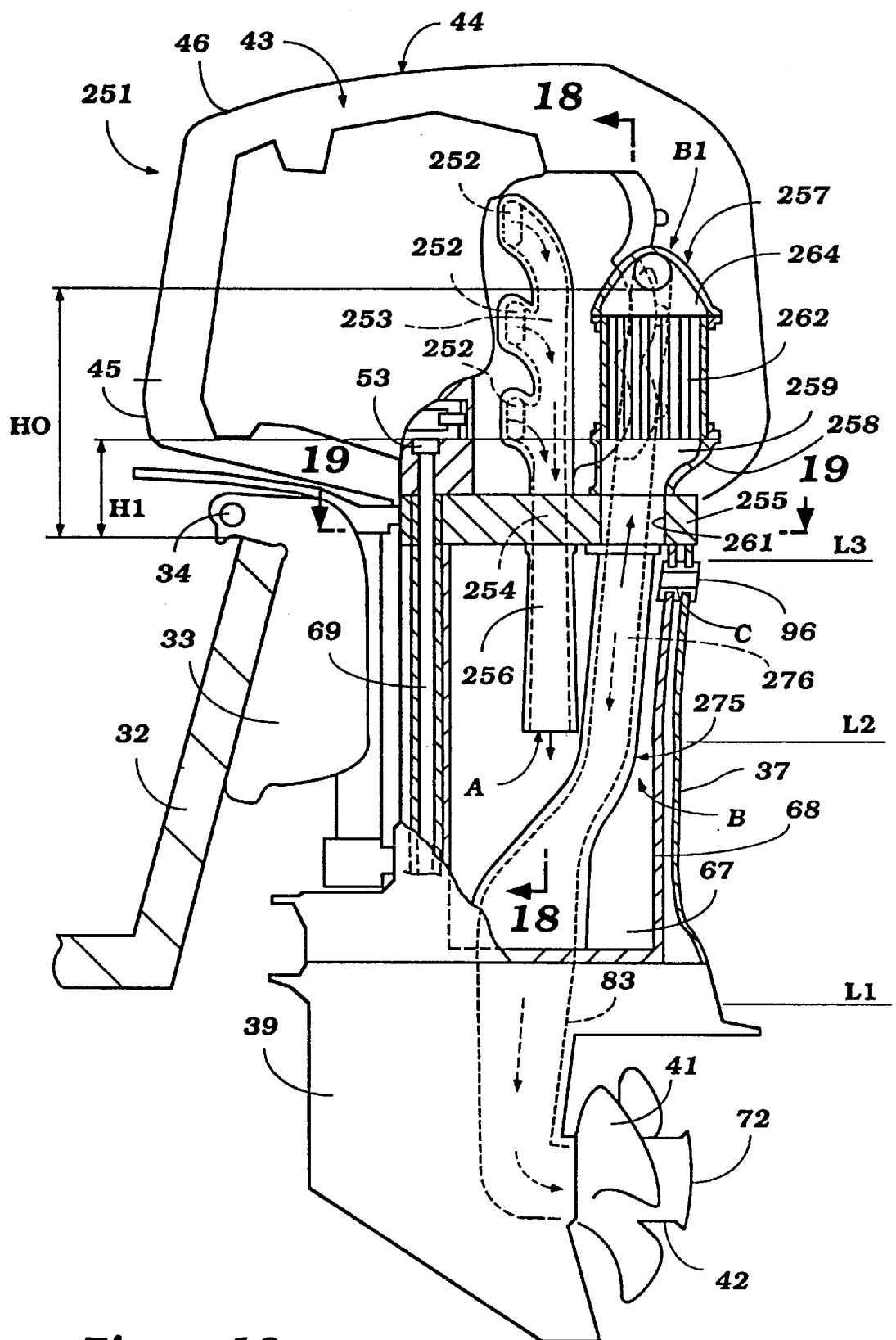
FIG. 16 is a side elevational view, in part similar to FIGS. 1, 5, 10 and 13, and shows a fifth embodiment of an outboard motor with portions broken away and other portions shown in section.

It may be seen from FIG. 16 that the horizontal portions 269 of the trap section are disposed at a substantial height $H_0$ above transom 32 and well above the highest anticipated water level L3. In addition, the lower end of the catalyst bed 262 is also positioned at a substantial height $H_1$ above the transom, and thus the catalyst bed is well-protected from water splashing, as in the previously described embodiments.

Figure 20:
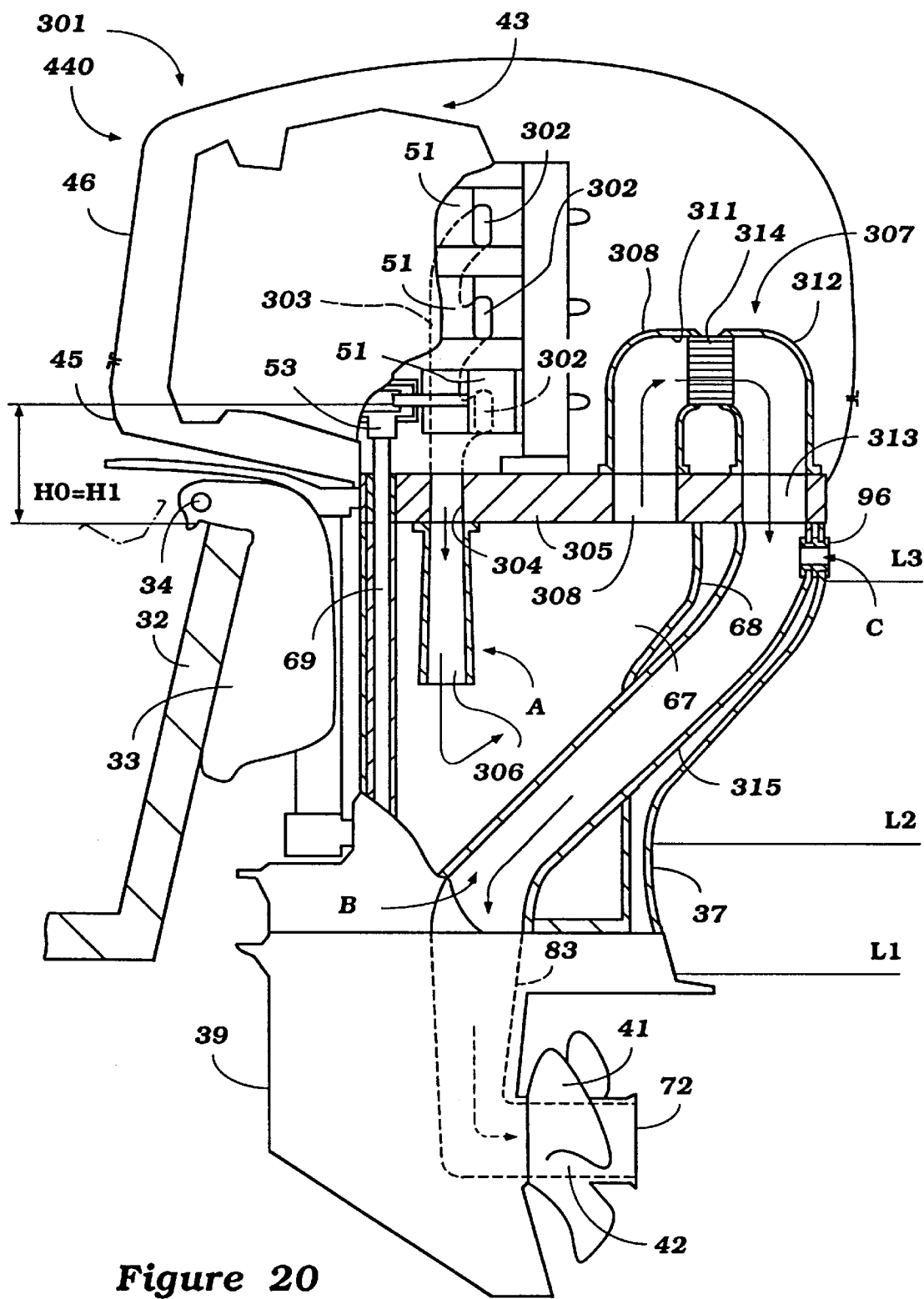
FIG. 20 is a side elevational view, in part similar to FIGS. 1, 5, 10, 13 and 16, and shows an outboard motor constructed in accordance with a sixth embodiment of the invention, with portions shown in section and other portions broken away.

Embodiment of FIG. 20

An outboard motor constructed in accordance with a sixth embodiment of the invention is shown in this figure and is identified generally by the reference numeral 301. Like the other embodiments, many of the components are the same, and where that is the case, those components have been identified by the same reference numeral, and these components will only be described again insofar as is necessary to understand the construction and operation of this embodiment.

Basically, the differences between this embodiment and those previously described are that a portion of the second exhaust conduit B passes externally of the expansion chamber 67, and the catalyst bed is removably supported in the power head within the protective cowling 44 in a slightly different manner.

In this embodiment, the exhaust ports 302 are formed in the valley between the cylinder banks 302. These exhaust ports communicate with respective exhaust manifolds 303, which extend downwardly and communicate at their lower ends with exhaust passages 304 formed in a spacer plate 305. As with the previously described embodiments, the spacer plate 305 supports the engine 43 on its upper side and is supported on its underside on the drive shaft housing 37.

Exhaust pipes 306 are affixed to the underside of the spacer plate 305 and receive the exhaust gases from the openings 304 therein. Like the previously described embodiments, the exhaust pipes 306 terminate in the expansion chamber 67 above the highest normal expected water level L2 formed when the watercraft and outboard motor 301 are stationary.

A trap device, indicated generally by the reference number 307, is provided at the rear end of the power head within the protective cowling 44 so as to transfer the exhaust gases from the expansion chamber 67 to the underwater exhaust gas discharge 72. This trap device comprises a first section 308 that extends upwardly from an aperture 309 in the plate 305 and has an L shape so as to form a portion of a horizontally extending section 311. A second pipe section 312 extends downwardly to an opening 313 in the spacer plate 305. The pipe sections 308 and 312 have a slip fit to a catalyst bed 314 through which the exhaust gases must flow to exit the opening 313 in the plate 305. Because of this construction, the catalyst bed 314 may be readily removed and replaced.

A further exhaust conduit 315 is affixed to the lower side of the spacer plate 305 and has its inlet end communicating with the spacer exhaust opening 313. It should be noted that the conduit 315, at its upper end, is disposed rearwardly of the expansion chamber 67 and intersects its wall 68 toward its lower end where it then passes in part through the expansion chamber 67 and registers with the lower unit exhaust gas discharge conduit 83. The exhaust gases then exit through the high-speed underwater exhaust gas discharge 72 in the manner of the previously described embodiments.

In this embodiment, the above-the-water exhaust gas discharge 96 communicates directly with the conduit 315 at a point immediately adjacent the spacer plate 305 so as to ensure that even during extreme decelerations, the water level (L3) will not enter the exhaust system.

Figure 21:
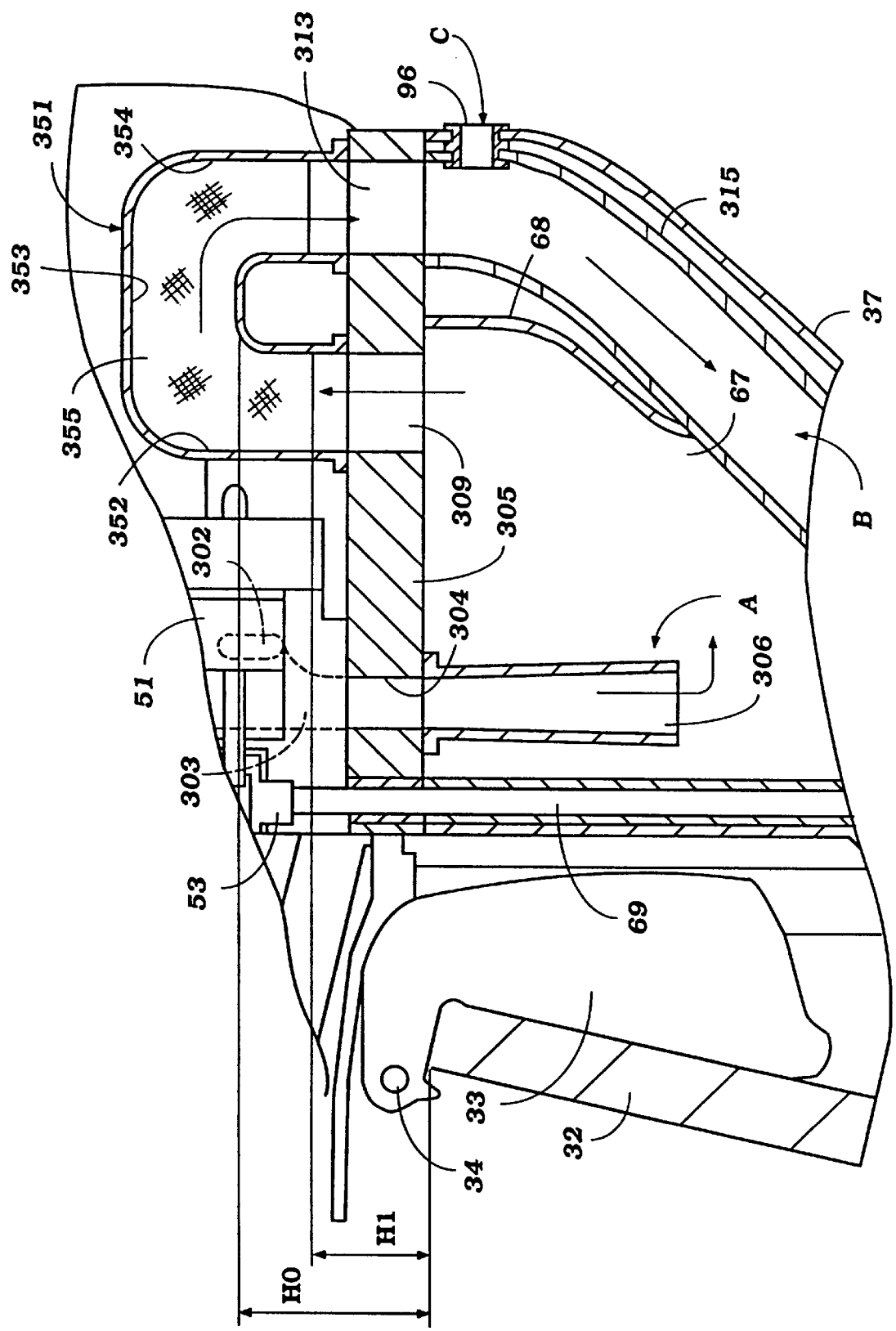
FIG. 21 is an enlarged view of an area similar to a portion of the area shown in FIG. 20 but illustrates a seventh embodiment of the invention.

Embodiment of FIG. 21

FIG. 21 shows another embodiment of the invention that is substantially the same as that of FIG. 20 and, for this reason, only a partial figure is believed to be necessary to illustrate the construction and operation of this embodiment. This embodiment differs from the previously described embodiment only in the construction of the trap portion of the conduit B, which trap section is indicated generally by the reference numeral 351 in this figure. Like the other embodiments, the trap section 351 has a vertically upwardly extending section 352 that forms the inlet for receiving exhaust gases from the expansion chamber 37 through the opening 309 in the spacer plate 313. This merges into a horizontally extending section 353, which extends in a fore and aft direction and which terminates at a downwardly extending section 354 that communicates with the pipe 315 and plate opening 313 for delivering the exhaust gases thereto.

In this embodiment, the entire trap section 351 is removable, and it is provided with a catalytic bed 355 that extends across the horizontal section 353 and down into the vertical sections 352 and 354, terminating at a distance above the upper surface of the spacer plate 305. This provides a greater area of catalyst for catalytic treatment of the exhaust gases. However, the catalyst 355 is still protected from water intrusion by its high location. It should be noted that the lowest point of the catalyst bed 355 is still at a distance $H_1$ above the transom, while the lower wall of the trap is at a higher distance $H_0$ above the transom.

Figure 22:
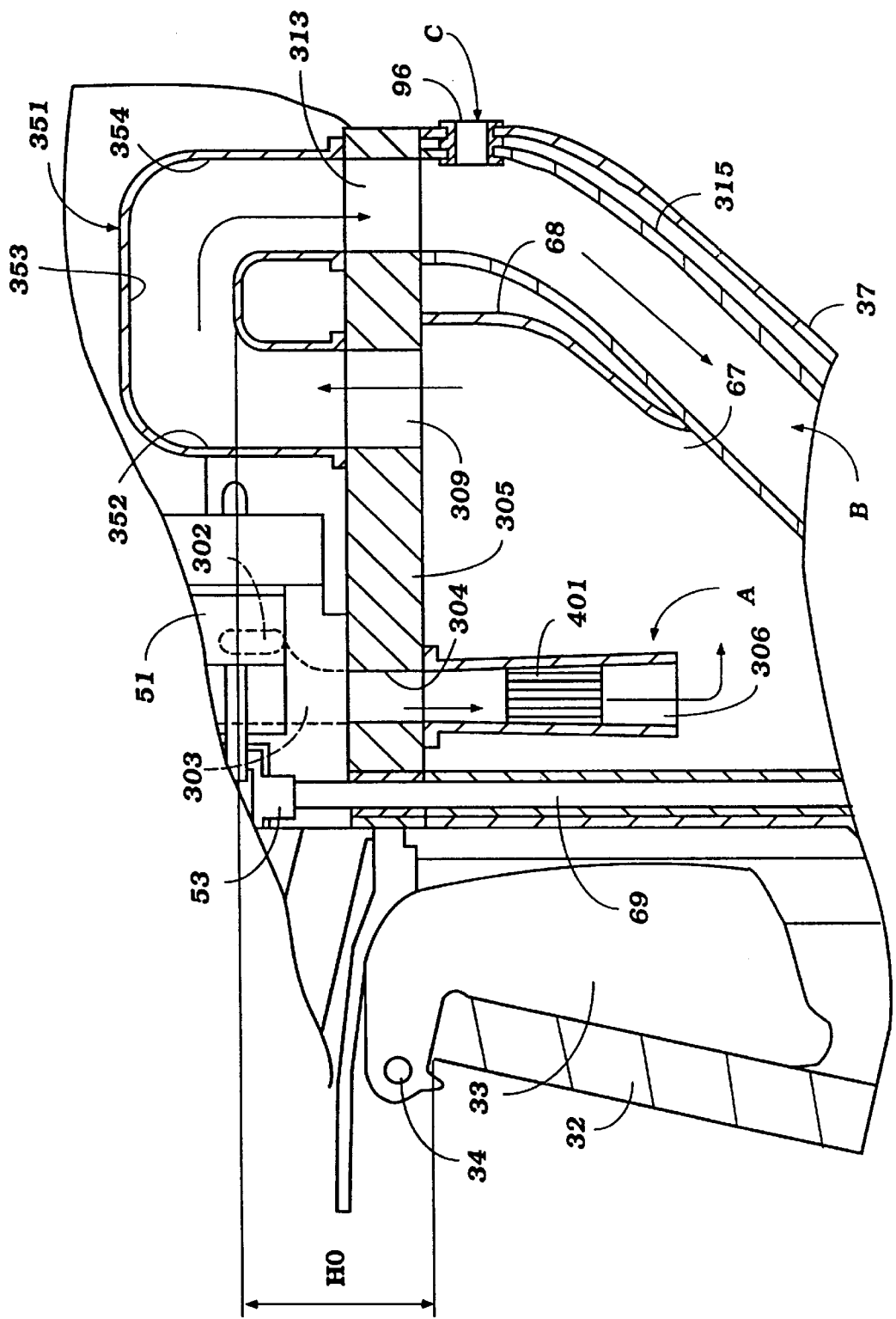
FIG. 22 is a cross-sectional view, in part similar to FIGS. 20 and 21, and shows an eighth embodiment of the invention.

Embodiment of FIG. 22

FIG. 22 shows another embodiment of the invention that differs from the embodiments of FIGS. 20 and 21 only in the placement of the catalyst, and for that reason components which are the same as those of the previously described embodiments have been identified by the same reference numerals and will not be described again.

In this embodiment, the trap section 351 has no catalytic material in it, and thus just has the two vertical sections 352 and 354 and the horizontal section 353. In this embodiment, catalytic beds 401 are positioned in the lower ends of the exhaust pipes 306, and thus are still further removed from any point where water may enter the expansion chamber through the underwater exhaust gas discharge. The catalyst beds 401 can be easily replaced when the spacer plate 305 is removed.

Figure 23:
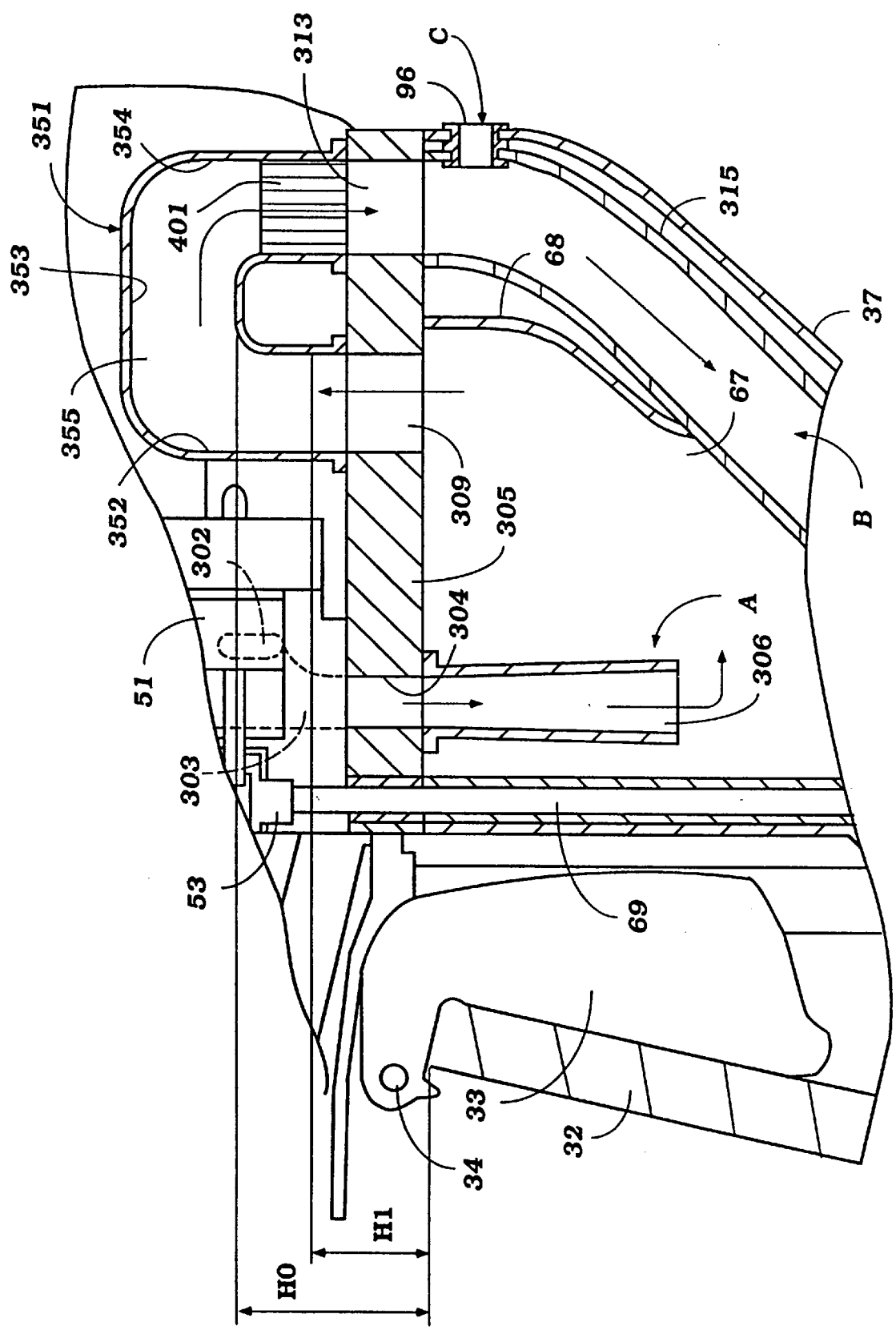
FIG. 23 is a cross-sectional view, in part similar to FIGS. 20, 21 and 22, and shows a ninth embodiment of the invention.

Embodiment of FIG. 23

FIG. 23 shows another embodiment that differs from the embodiments of FIGS. 20, 21 and 22 only in the placement of the catalyst, and the trap section 351 has the same construction, except for catalyst location, as the embodiments of FIGS. 21 and 22. For that reason, common reference numerals are applied to parts that are the same or substantially the same, and these parts will not be described again, except insofar as is necessary to understand the relationship to the invention.

In this embodiment, a catalytic bed 401 is positioned in the vertical section 354 of the trap section 351 immediately adjacent the opening 313 in the spacer plate 305. Hence, the catalytic bed 401 is still at a height $H_1$ above the transom, and thus will be protected, although it is lower than the lowest height $H_0$ of the horizontal portion 353 of the trap section 351. This end placement permits the catalyst bed to be removed from the trap section 351 for service.

Figure 24:
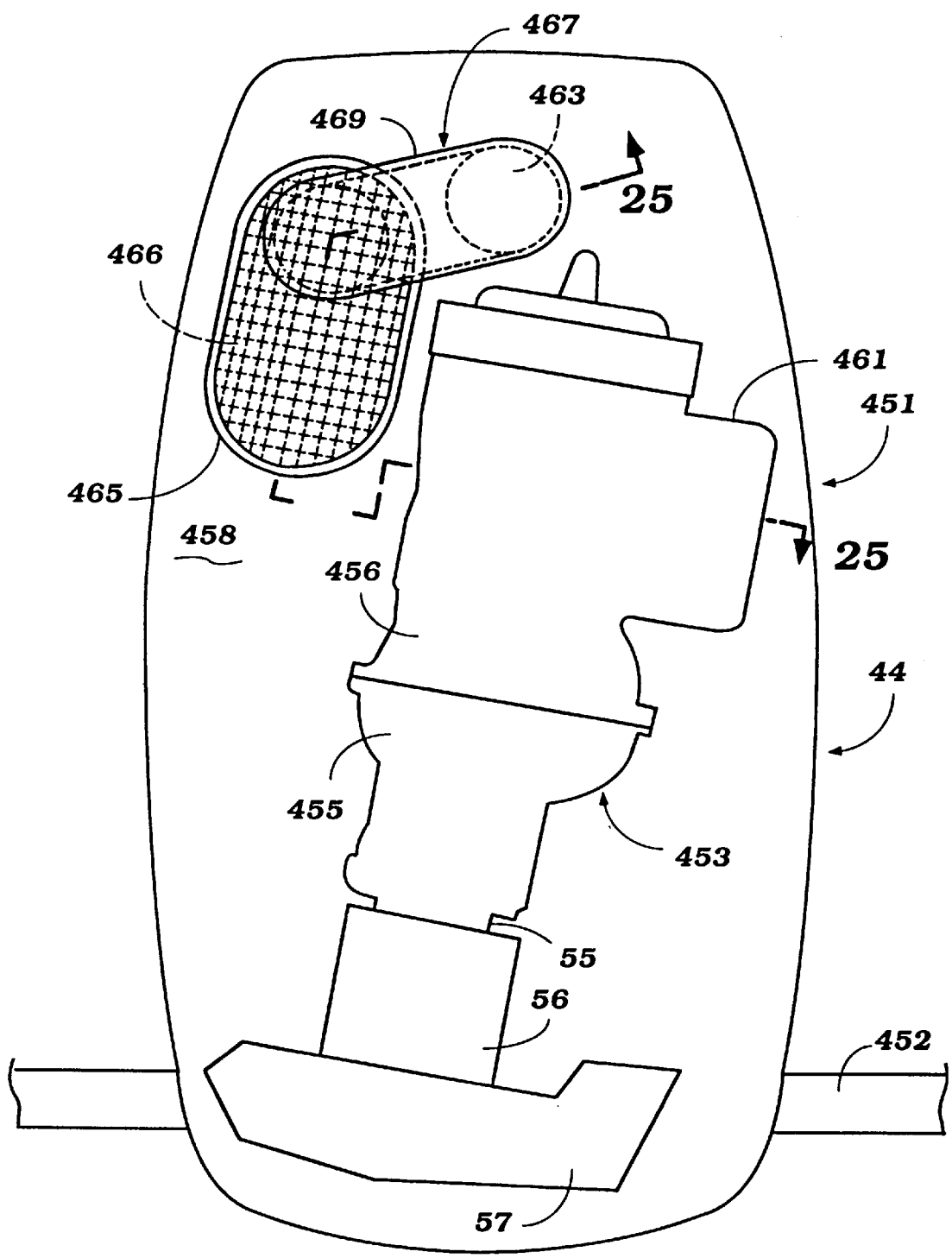
FIG. 24 is a top plan view showing a tenth embodiment of the invention as applied to an in-line type of engine.
Figure 25:
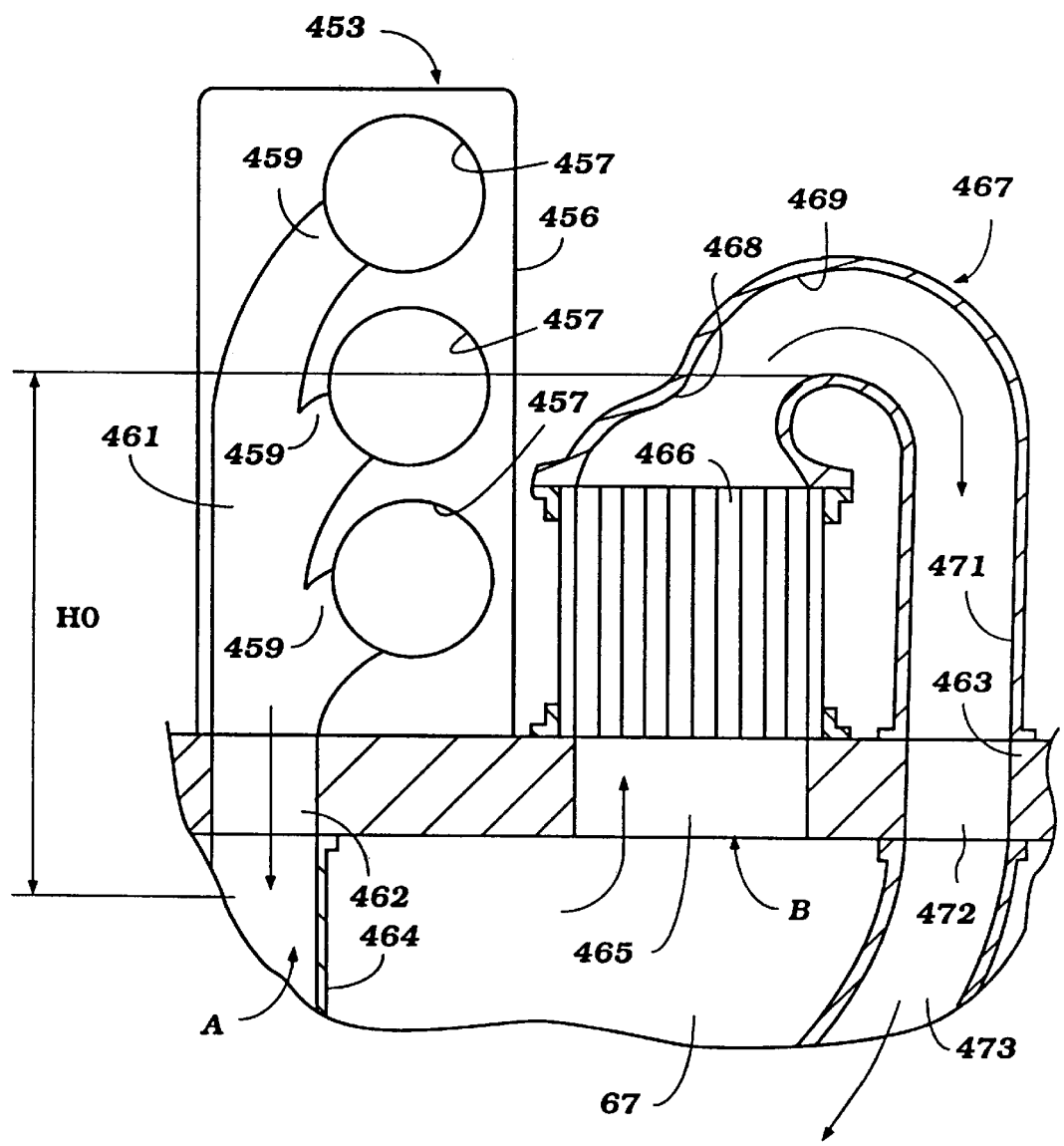
FIG. 25 is a cross-sectional view taken along the line 25—25 of FIG. 24.

Embodiment of FIGS. 24 and 25

Thus far, all of the embodiments of the invention have been described in conjunction with V-type engines. FIGS. 24 and 25 show a further embodiment of the invention applied to an in-line type of engine. This type of engine presents a greater problem in connection with space limitations due to the greater length or height of the engine between the lower end of the induction system and the upper end of the cylinder head. However, these figures show how this can be accommodated to provide a compact construction having a trap section and a catalytic converter. Although a particular type of trap section and catalytic converter is illustrated in these figures, it will be apparent to those skilled in the art how the invention can be practiced by utilizing any of the types of trap sections and catalytic converter arrangements, as previously described.

An outboard motor constructed in accordance with this embodiment of the invention is identified generally by the reference numeral 451 and is shown attached to a transom of a watercraft 452. Since the drive shaft housing and lower unit construction may be the same as the previously described embodiments, these components have been identified by the same reference numerals. In addition, the induction system is generally the same but does not require dual side draft carburetors. Because of the similarities, components that are the same or substantially the same as those previously described have been identified by the same reference numerals and will not be described again, except insofar as is necessary to understand the construction and operation of this embodiment.

The engine is indicated generally by the reference numeral 453, and includes a crank case member 454 from which a cylinder block 455 extends. The cylinder block is provided with one or more cylinder bores, there being three such cylinders in the illustrated embodiment, which are identified by the reference numeral 457. In order to provide a compact assembly and provide room within the protective cowling 44, the engine 453 is rotated about a vertically extending axis coincident with its crank shaft to a position wherein the cylinder block 456 and cylinder bores 457 are inclined at an acute angle to a longitudinally extending vertical plane. This opens a space, indicated generally by the reference numeral 458, on one side of the engine and specifically adjacent the cylinder block 456.

Exhaust ports 459 are formed on the opposite side of the cylinder block 456 and terminate in an exhaust manifold 461, which is disposed on this side of the engine. This exhaust manifold 461 communicates with an opening 462 in a spacer plate 463 that is disposed beneath the engine 452 and above the drive shaft housing, as with the other embodiments. An exhaust pipe 464 is affixed to the underside of the spacer plate 463 and discharges exhaust gases into the expansion chamber 67, as with the previously described embodiments. The exhaust manifold 461, spacer opening 462 and exhaust pipe 464 thus form the conduit section A that delivers exhaust gases from the engine 453 to the expansion chamber 67.

In the area 458 of the spacer plate 463, there is formed a further exhaust gas opening 465, which forms the inlet to the conduit section B that extends from the expansion chamber to the underwater exhaust gas discharge 72, which is not shown in these figures. A catalyst bed 466 is positioned directly above this opening 465 so that the exhaust gases must flow through this catalyst bed before entering the remainder of a trap section, indicated generally by the reference numeral 467. This trap section 467 includes a first generally vertically upwardly extending portion 468 that extends from above the catalyst bed 466 to a horizontal section 469, which has its lowest point at a height $H_0$ above the transom. This trap section 469 extends generally transversely to the pivot axis of the outward motor 451 about the transom 452, and thus has the advantages of the embodiments sharing this feature.

A downwardly extending section 471 of the trap section 467 communicates with an opening 472 in the spacer plate 463. A conduit 473 extends from the opening 472 to the underwater exhaust gas discharge 72. Hence, it should be apparent that this construction also provides a very compact assembly, but nevertheless incorporates a trap between the underwater exhaust gas discharge and the expansion chamber 67 that extends above the water level, is contained within the power head protective cowling 44, and at a substantial height above the transom of the associated water. As previously noted, the trap or catalyzer placement arrangements of any of the other embodiments may be utilized with in-line engines of this or other types.

From the foregoing description it should be readily apparent that all embodiments of the invention ensure against the passage of water into the engine from the expansion chamber. In addition, the described embodiments all provide an effective way in which catalytic exhaust treatment is possible and wherein the catalytic converter is also protected from damage by water. In all embodiments the trap portion is positioned at the rear portion of the powerhead and above the spacer plate on which the engine is mounted. Because of this elevated rear mounting, when the outboard motors of any of the described embodiments are tilted up about the tilt axis defined by the pivot pin 34, any water which may remain in the exhaust system will not be able to flow to the expansion chamber.

Of course, the preceding description is that of the preferred embodiments of the invention, and various changes and modifications may be made without departing from the spirit and scope of the invention, as defined by the appended claims.

We claim:

1. An outboard motor having a power head comprised of an internal combustion engine having an exhaust port and a surrounding protective cowling, a drive shaft housing and lower unit depending from said power head and containing a propulsion device driven by said engine for propelling associated watercraft, means for affixing said outboard motor to a hull of an associated watercraft for pivotal movement about a horizontally disposed tilt axis, an expansion chamber formed in said drive shaft housing and lower unit and positioned to be at least partially submerged beneath the body of water in which the watercraft is operating at least when the watercraft is stationary, an exhaust pipe extending from said exhaust port into said expansion chamber below the upper end thereof for delivering exhaust gases from said engine to said expansion chamber, an underwater exhaust gas discharge positioned to extend beneath the water level in substantially all running conditions of the watercraft, and exhaust conduit means extending from said expansion chamber to said underwater exhaust gas discharge for delivering exhaust gases from said engine to the atmosphere through the body of water in which said watercraft is operating, said exhaust conduit means including a trap portion for precluding the entry of water into said expansion chamber from said underwater exhaust gas discharge comprised of, a first upwardly extending section extending upwardly from an inlet end in said expansion chamber, a horizontally extending section disposed entirely above the water level and said tilt axis and receiving gases from the upwardly extending section at one end thereof, and a downwardly extending section extending from the other end of said horizontally extending section to said underwater exhaust gas discharge.

2. An outboard motor as set forth in claim 1, wherein the entire horizontally extending section is also disposed above the upper edge of the transom of a watercraft to which said outboard motor is attached.

3. An outboard motor as set forth in claim 1, wherein the horizontally extending section is disposed entirely within the protective cowling.

4. An outboard motor as set forth in claim 3, wherein the entire horizontally extending section is also disposed above the upper edge of the transom of a watercraft to which said outboard motor is attached.

5. An outboard motor as set forth in claim 1, further including a catalyst bed through which the exhaust gases pass from the exhaust port to the underwater exhaust gas discharge.

6. An outboard motor as set forth in claim 5, wherein the catalyst bed is disposed in the trap portion.

7. An outboard motor as set forth in claim 6, wherein the catalyst bed is disposed in the upwardly extending section of the trap section.

8. An outboard motor as set forth in claim 6, wherein the catalyst bed is disposed in the horizontally extending section of the trap portion.

9. An outboard motor as set forth in claim 6, wherein the catalyst bed is disposed in the downwardly extending section of the trap portion.

10. An outboard motor as set forth in claim 6, wherein the entire horizontally extending section is also disposed above the upper edge of the transom of a watercraft to which said outboard motor is attached.

11. An outboard motor as set forth in claim 6, wherein the entire horizontally extending section is also disposed entirely within the protective cowling.

12. An outboard motor as set forth in claim 11, wherein the entire horizontally extending section is also disposed above the upper edge of the transom of a watercraft to which said outboard motor is attached.

13. An outboard motor having a power head comprised of an internal combustion engine having an exhaust port and a surrounding protective cowling, a drive shaft housing and lower unit depending from said power head and containing a propulsion device driven by said engine for propelling associated watercraft, means for affixing said outboard motor to a hull of an associated watercraft, an expansion chamber formed in said drive shaft housing and lower unit and positioned to be at least partially submerged beneath the body of water in which the watercraft is operating at least when the watercraft is stationary, an exhaust pipe extending from said exhaust port into said expansion chamber below the upper end thereof for delivering exhaust gases from said engine to said expansion chamber, an underwater exhaust gas discharge positioned to extend beneath the water level in substantially all running conditions of the watercraft, and exhaust conduit means extending from said expansion chamber to said underwater exhaust gas discharge for delivering exhaust gases from said engine to the atmosphere through the body of water in which said watercraft is operating, said exhaust conduit means including a trap portion for precluding the entry of water into said expansion chamber from said underwater exhaust gas discharge comprised of, a first upwardly extending section extending upwardly from an inlet end in said expansion chamber, a horizontally extending section disposed above the water level and receiving gases from the upwardly extending section at one end thereof, and a downwardly extending section extending from the other end of said horizontally extending section to said underwater exhaust gas discharge, said trap portion being disposed at the level of said engine and in a rear portion of said power head behind said engine.

14. An outboard motor as set forth in claim 13, wherein the engine is a V engine having a pair of cylinder banks.

15. An outboard motor as set forth in claim 14, wherein the trap portion is formed at least in part in a valley disposed between the cylinder banks.

16. An outboard motor as set forth in claim 15, wherein the exhaust port and exhaust pipes are also disposed in the valley between the cylinder banks.

17. An outboard motor as set forth in claim 16, wherein each cylinder bank has a separate exhaust pipe associated therewith.

18. An outboard motor as set forth in claim 15, wherein the exhaust pipes and exhaust ports are disposed outside of the valley between the cylinder banks.

19. An outboard motor as set forth in claim 14, wherein the horizontally extending section of the trap portion extends transversely to the longitudinal direction.

20. An outboard motor as set forth in claim 14, wherein the upwardly extending section of the trap portion is disposed forwardly relative to the downwardly extending section.

21. An outboard motor as set forth in claim 14, wherein the downwardly extending section of the trap portion is disposed forwardly of the upwardly extending section.

22. An outboard motor as set forth in claim 14, wherein there is provided a catalyst bed in the trap portion.

23. An outboard motor as set forth in claim 22, wherein the catalyst bed is disposed in the upwardly extending section of the trap portion.

24. An outboard motor as set forth in claim 22, wherein the catalyst bed is disposed in the horizontally extending section of the trap portion.

25. An outboard motor as set forth in claim 22, wherein the catalyst bed is disposed in the downwardly extending section of the trap portion.

26. An outboard motor as set forth in claim 22, wherein the catalyst bed is removably contained within the trap portion for service purposes.

27. An outboard motor as set forth in claim 22, wherein there are a pair of catalyst beds disposed in the trap portion.

28. An outboard motor as set forth in claim 27, wherein the catalyst beds are in side-by-side relationship.

29. An outboard motor as set forth in claim 28, wherein the catalyst beds are each positioned in a respective one of a pair of upwardly extending sections.

30. An outboard motor having a power head comprised of an internal combustion engine having an exhaust port and a surrounding protective cowling, a drive shaft housing and lower unit depending from said power head and containing a propulsion device for propelling an associated watercraft which propulsion device is driven by said engine, means for affixing said outboard motor to a transom of the associated watercraft for pivotal movement about a horizontally disposed tilt axis, an expansion chamber formed in said drive shaft housing and lower unit and positioned to be at least partially submerged beneath the body of water in which the water craft is operating at least when the watercraft is stationary, an exhaust pipe extending from said exhaust port into said expansion chamber below the upper end thereof for delivering exhaust gases from said engine to said expansion chamber, an underwater exhaust gas discharge positioned to extend beneath the water level in substantially all running conditions of the watercraft, and exhaust conduit means extending from said expansion chamber to said underwater exhaust gas discharge for discharging exhaust gases from said engine to the atmosphere through the body of water in which the watercraft is operating, said exhaust conduit means including a trap portion for precluding the entry of water into said expansion chamber from said underwater exhaust gas discharge comprising an upwardly extending section extending upwardly from an inlet end in said expansion chamber, a horizontally extending section disposed entirely on the opposite side of said exhaust pipe from said tilt axis and extending transversely from the upper end of said upwardly extending section and parallel to said tilt pivot axis and a downwardly extending section extending from the other end of said horizontally extending section to said underwater exhaust gas discharge.

31. An outboard motor of claim 30, wherein the upwardly extending section and the downwardly extending section of the trap portion are disposed on opposite sides of the horizontally extending section for flow transversely across the horizontally extending section.

32. An outboard motor of claim 30, wherein the horizontally extending section extends in opposite directions from the upwardly extending section and has downwardly extending sections at the opposite ends thereof to provide two paths to the underwater exhaust gas discharge.

33. An outboard motor of claim 30, further including a catalyst bed disposed in the trap portion.

34. An outboard motor of claim 33, wherein the catalyst bed is disposed on the horizontally extending section.

35. An outboard motor of claim 34, wherein the upwardly extending section and the downwardly extending section of the trap portion are disposed on opposite sides of the horizontally extending section for flow transversely across the horizontally extending section.

36. An outboard motor of claim 33, wherein the catalyst bed is disposed on the upwardly extending section.

37. An outboard motor of claim 36, having a power head, wherein the horizontally extending section extends in opposite directions from the upwardly extending section and has downwardly extending sections at the opposite ends thereof to provide two paths to the underwater exhaust gas discharge.

38. An outboard motor having a power head comprised of, a "V" type internal combustion engine having a pair of angularly disposed cylinder banks each having an exhaust port and a surrounding protective cowling, a drive shaft housing and lower unit depending from said power head and containing a propulsion device driven by said engine for propelling associated watercraft, means for affixing said outboard motor to a hull of an associated watercraft, an expansion chamber formed in said drive shaft housing and lower unit in position to be at least partially submerged below the body of water in which the watercraft is operating at least when the watercraft is stationary, an exhaust pipe extending from said exhaust ports into said expansion chamber below the upper end thereof for delivering exhaust gases from said engine to said expansion chamber, an underwater exhaust gas discharge positioned to extend below the water level in substantially all running conditions of the watercraft, and exhaust conduit means extending from said expansion chamber to said underwater exhaust gas discharge to discharge the exhaust gases from said engine to the atmosphere to the body of water in which said watercraft is operating, said exhaust conduit means including a trap portion disposed at least in part in a valley formed between said cylinder banks for precluding the entry of water into said expansion chamber from said underwater exhaust gas discharge comprising, an upwardly extending section extending from an inlet end in said expansion chamber, a horizontally extending section connected at one end to said upwardly extending section and a downwardly extending section extending from the other end of said horizontally extending section to said underwater exhaust gas discharge.

39. An outboard motor of claim 38, further including a catalyst bed through which the exhaust gases pass from the exhaust port to the underwater exhaust gas discharge.

40. An outboard motor of claim 39, wherein the catalyst bed is disposed in the trap portion.

41. An outboard motor of claim 40, wherein the catalyst bed is disposed in the upwardly extending section of the trap portion.

42. An outboard motor of claim 40, wherein the catalyst bed is disposed in the horizontally extending section of the trap portion.

43. An outboard motor of claim 40, wherein the catalyst bed is disposed in the downwardly extending section of the trap portion.

44. An outboard motor of claim 39, wherein the catalyst bed is disposed in the exhaust pipe.

45. An outboard motor of claim 38, wherein the trap section is disposed at a rear portion of the power head behind the engine.

46. An outboard motor of claim 38, wherein the exhaust port and exhaust pipes are also disposed in the valley between the cylinder banks.

47. An outboard motor of claim 46, wherein each cylinder bank has a separate exhaust pipe associated therewith.

48. An outboard motor of claim 38, wherein the horizontally extending section of the trap portion extends transversely to the longitudinal direction.

49. An outboard motor of claim 38, wherein the upwardly extending section of the trap portion is disposed forwardly relative to the downwardly extending section.

50. An outboard motor of claim 38, wherein the downwardly extending section of the trap portion is disposed forwardly of the upwardly extending section.

51. An outboard motor of claim 38, wherein there is provided a catalyst bed in the trap portion.

52. An outboard motor of claim 51, wherein the catalyst bed is disposed in the upwardly extending section of the trap portion.

53. An outboard motor of claim 51, wherein the catalyst bed is disposed in the horizontally extending section of the trap portion.

54. An outboard motor of claim 51, wherein the catalyst bed is disposed in the downwardly extending section of the trap portion.

55. An outboard motor of claim 51, wherein the catalyst bed is removably contained within the trap portion for service purposes.

56. An outboard motor of claim 51, wherein there are a pair of catalyst beds disposed in the trap portion.

57. An outboard motor of claim 56, wherein the catalyst beds are in side-by-side relationship.

58. An outboard motor of claim 57, wherein the catalyst beds are each positioned in a respective one of a pair of upwardly extending sections.

59. An outboard motor of claim 38, wherein the engine has a plurality of cylinders aligned in a vertical row.

60. An outboard motor of claim 59, wherein at least a portion of the trap section is disposed on one side of the cylinders.

61. An outboard motor having a power head comprised of an internal combustion engine having a plurality of in line horizontally extending cylinders each having at least one exhaust port and a surrounding protective cowling, a drive shaft housing and lower unit depending from said power head and containing a propulsion device driven by said engine for propelling an associated watercraft to which said outboard motor is attached, said cylinders being inclined to a longitudinally extending vertical plane extending parallel to the direction of the propulsion force and at an acute angle to said longitudinally extending vertical plane, an expansion chamber formed in said drive shaft housing and lower unit, exhaust pipe means for conveying exhaust gases from said exhaust ports to said expansion chamber, an underwater exhaust gas discharge for discharging exhaust gases to the atmosphere through the body of water in which said watercraft is operating and conduit means for conveying exhaust gases to said underwater exhaust gas discharge from said expansion chamber, said conduit means including a trap portion for precluding the entry of water into said expansion chamber from said underwater exhaust gas discharge, said trap portion being contained within said power head apart from said engine and disposed at least in part on the side of said cylinders adjacent said longitudinally extending vertical plane and in part between said cylinders and said plane.

62. An outboard motor of claim 61, wherein the trap portion includes a horizontally extending section disposed above the level of water in which the associated watercraft is operating.

63. An outboard motor of claim 62, further including a catalyst bed disposed in the trap portion for treating the exhaust gases.

64. An outboard motor of claim 63, wherein the catalyst bed is disposed in the horizontally extending section.

65. An outboard motor of claim 64, wherein the catalyst bed also extends into at least one vertically extending section that merges into the horizontally extending section.

66. An outboard motor of claim 65, wherein the trap section includes two vertically extending sections and the catalyst bed extends into both of said vertically extending sections.

67. An outboard motor of claim 63, wherein the catalyst bed is disposed in a vertically extending section of the trap portion.

68. An outboard motor of claim 61, further including a catalyst disposed within the power head and independently of the exhaust pipe for treating exhaust gas.

69. An outboard motor of claim 61, wherein the engine has a pair of angularly inclined cylinder banks, each containing at least a pair of cylinders and each of the cylinder banks is disposed at an acute angle and on opposite sides of the longitudinally extending plane.

70. An outboard motor having a power head comprised of an internal combustion engine having an exhaust port and a surrounding protective housing, a drive shaft housing and lower unit depending from said power head and containing a propulsion device driven by said engine for propelling associated watercraft, means for affixing said outboard motor to a hull of an associated watercraft, an expansion chamber formed in said drive shaft housing and lower unit and positioned to be at least partially submerged beneath the body of water in which the watercraft is operating at least when the watercraft is stationary, an exhaust pipe extending from said exhaust port into said expansion chamber below the upper end thereof for delivering exhaust gases from said engine to said expansion chamber, an underwater exhaust gas discharge positioned to extend beneath the water level in substantially all running conditions of the watercraft, and exhaust conduit means extending from said expansion chamber to said underwater exhaust gas discharge for delivering exhaust gases from said engine to the atmosphere through the body of water in which said watercraft is operating, said exhaust conduit means including a trap portion for precluding the entry of water into said expansion chamber from said underwater exhaust gas discharge comprised of, a pair of upwardly extending sections extending upwardly from an inlet end in said expansion chamber, a horizontally extending section disposed above the water level and receiving gases from the upwardly extending section at one end thereof, and a downwardly extending section extending from the other end of said horizontally extending section to said underwater exhaust gas discharge, and a pair of separate catalyst beds each positioned in a respective one of said pair of upwardly extending sections and separated from each other.

* * * * *

UNITED STATES PATENT AND TRADEMARK OFFICE
CERTIFICATE OF CORRECTION

PATENT NO.   : 5,911,608
DATED        : June 15, 1999
INVENTOR(S)  : Nakayama et al.

It is certified that error appears in the above-identified patent and that said Letters Patent is hereby corrected as shown below:

<u>Column 20,</u>
Line 28, please delete "36, having a power head, wherein" and replace with -- 36, wherein --

Signed and Sealed this

Eighteenth Day of June, 2002

*Attest:*

*Attesting Officer*

JAMES E. ROGAN
*Director of the United States Patent and Trademark Office*